United States Patent
Morikawa

(10) Patent No.: US 11,140,295 B2
(45) Date of Patent: Oct. 5, 2021

(54) IMAGE READING APPARATUS AND METHOD CONFIGURED TO CORRECT TILT IMAGE DATA

(71) Applicant: CANON KABUSHIKI KAISHA, Tokyo (JP)

(72) Inventor: Daisuke Morikawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/010,686

(22) Filed: Sep. 2, 2020

(65) Prior Publication Data

US 2021/0075933 A1 Mar. 11, 2021

(30) Foreign Application Priority Data

Sep. 11, 2019 (JP) .............................. JP2019-165458

(51) Int. Cl.
  *G06K 9/36* (2006.01)
  *H04N 1/387* (2006.01)
  *H04N 1/00* (2006.01)

(52) U.S. Cl.
  CPC ....... *H04N 1/3878* (2013.01); *H04N 1/00718* (2013.01); *H04N 1/00748* (2013.01); *H04N 1/00785* (2013.01)

(58) Field of Classification Search
  CPC ............. H04N 1/3878; H04N 1/00718; H04N 1/00748; H04N 1/00785
  USPC ......................................................... 382/289
  See application file for complete search history.

(56) References Cited

U.S. PATENT DOCUMENTS

| | | | |
|---|---|---|---|
| 2016/0088186 A1* | 3/2016 | Kawano | H04N 1/409 358/474 |
| 2017/0094111 A1* | 3/2017 | Shimahashi | H04N 1/60 |
| 2018/0048786 A1* | 2/2018 | Sunada | H04N 1/3878 |
| 2020/0336615 A1* | 10/2020 | Ono | G06K 9/3275 |

FOREIGN PATENT DOCUMENTS

| | | |
|---|---|---|
| JP | 2014-239367 A | 12/2014 |
| JP | 2017-112412 A | 6/2017 |

* cited by examiner

*Primary Examiner* — Gabriel I Garcia
(74) *Attorney, Agent, or Firm* — Canon U.S.A., Inc. IP Division

(57) ABSTRACT

An image reading apparatus includes a reading unit configured to read an image of a document and generate image data, a filtering unit configured to perform filtering processing on the image data generated by the reading unit and generate image data, a binarization unit configured to perform binarization processing based on the image data generated by the filtering unit using a first threshold value to generate first binary image data, and perform binarization processing based on the image data generated by the filtering unit using a second threshold value to generate second binary image data, and a detection unit configured to detect an edge in the image data generated by the reading unit based on the first binary image data and the second binary image data generated by the binarization unit.

12 Claims, 20 Drawing Sheets

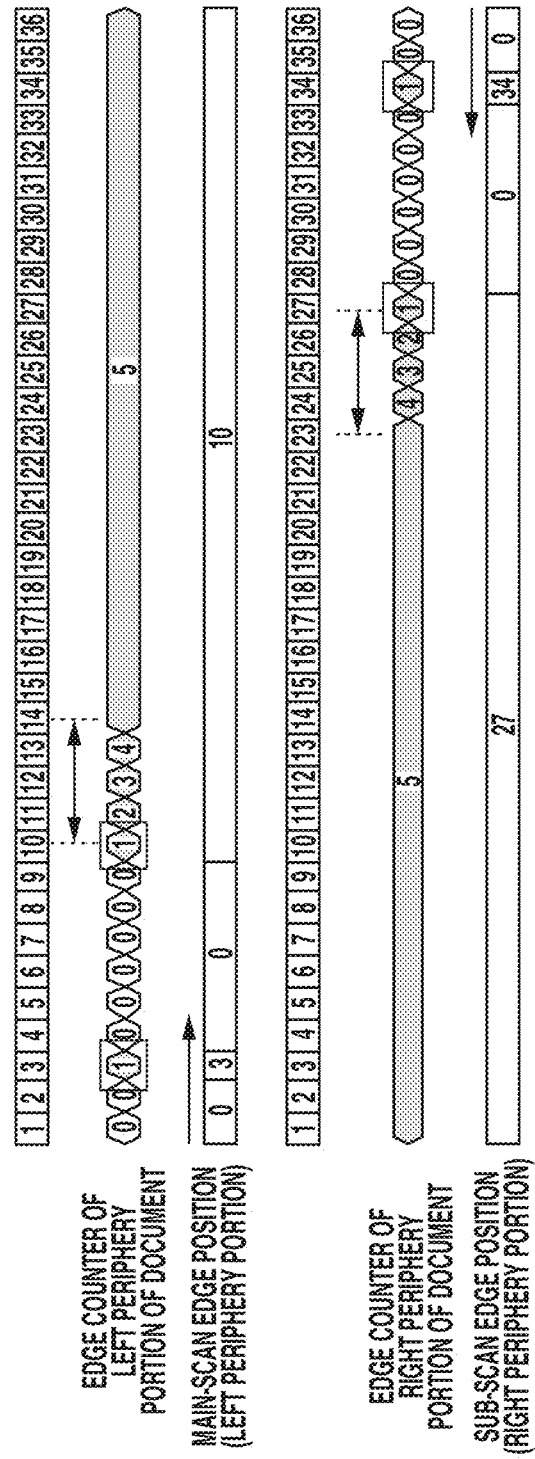

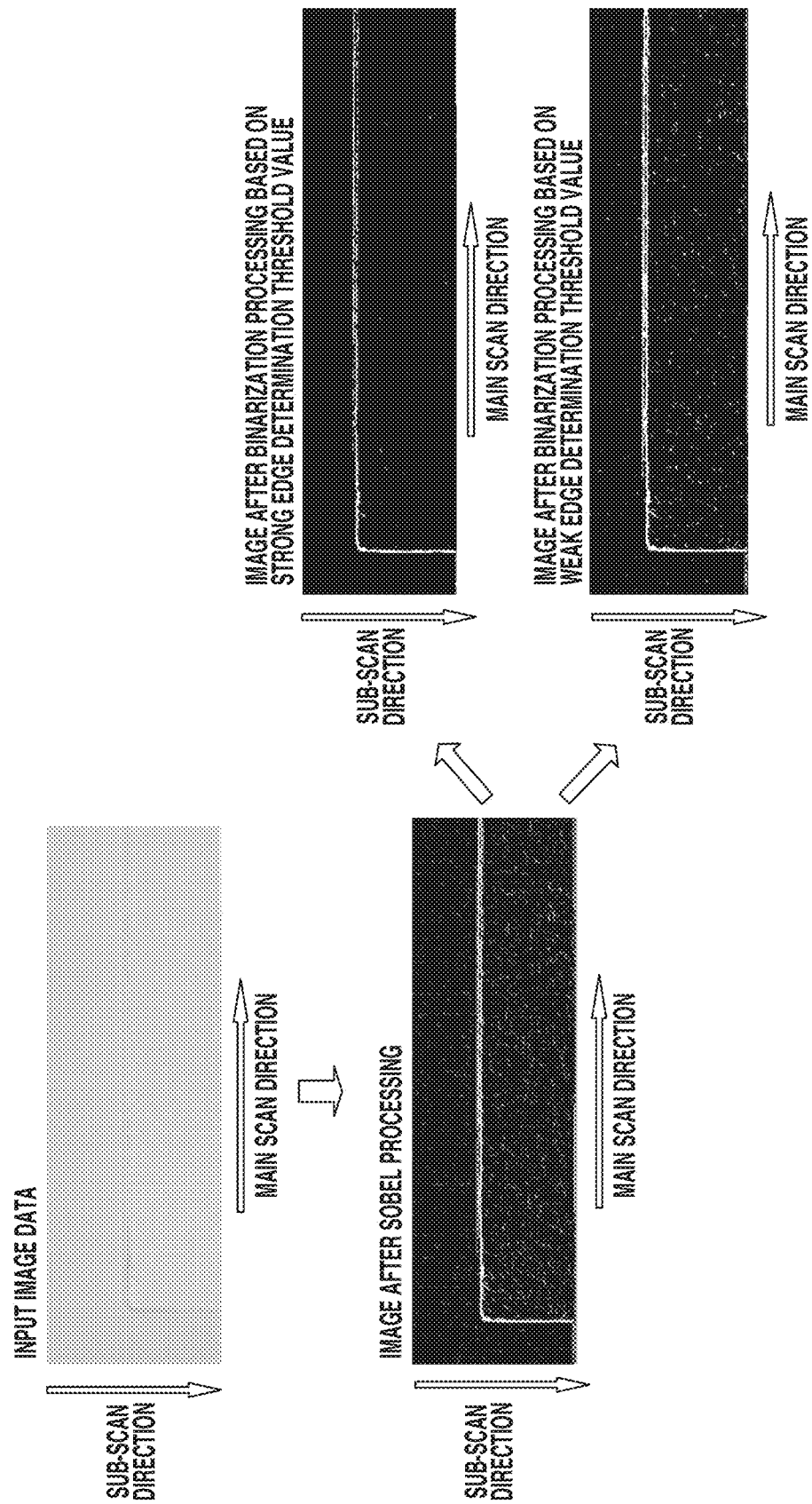

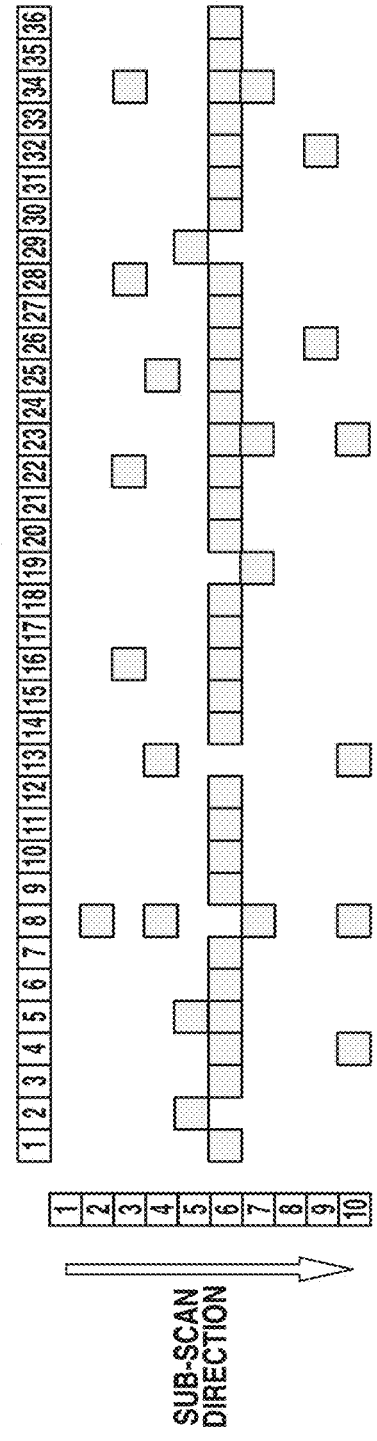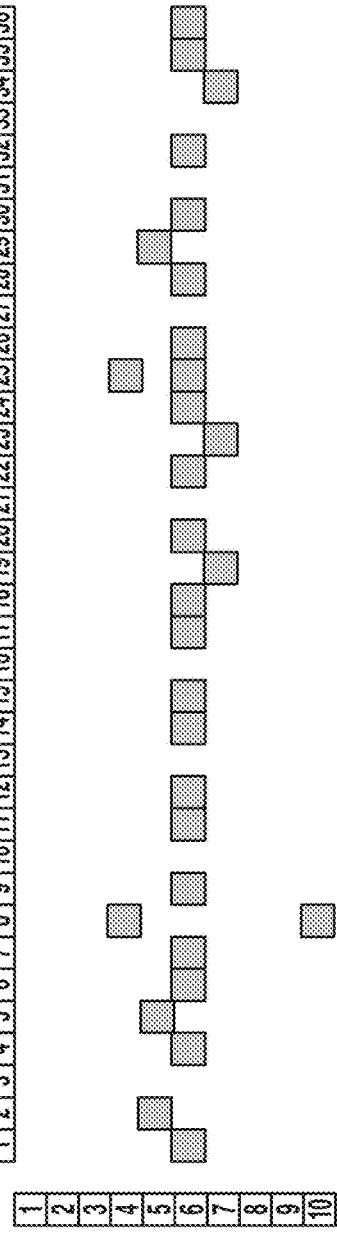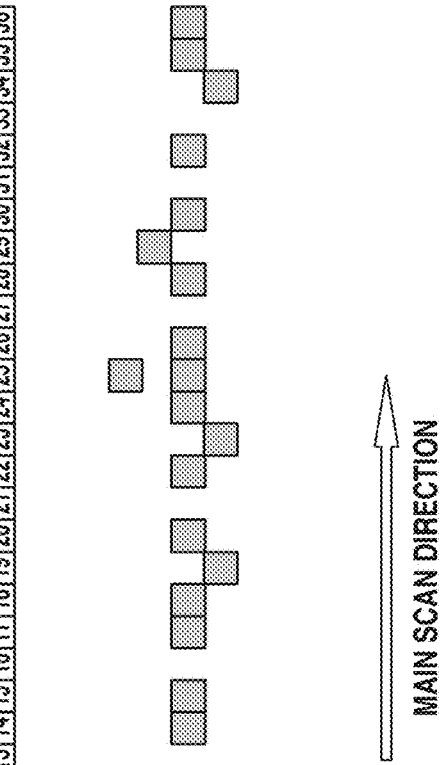

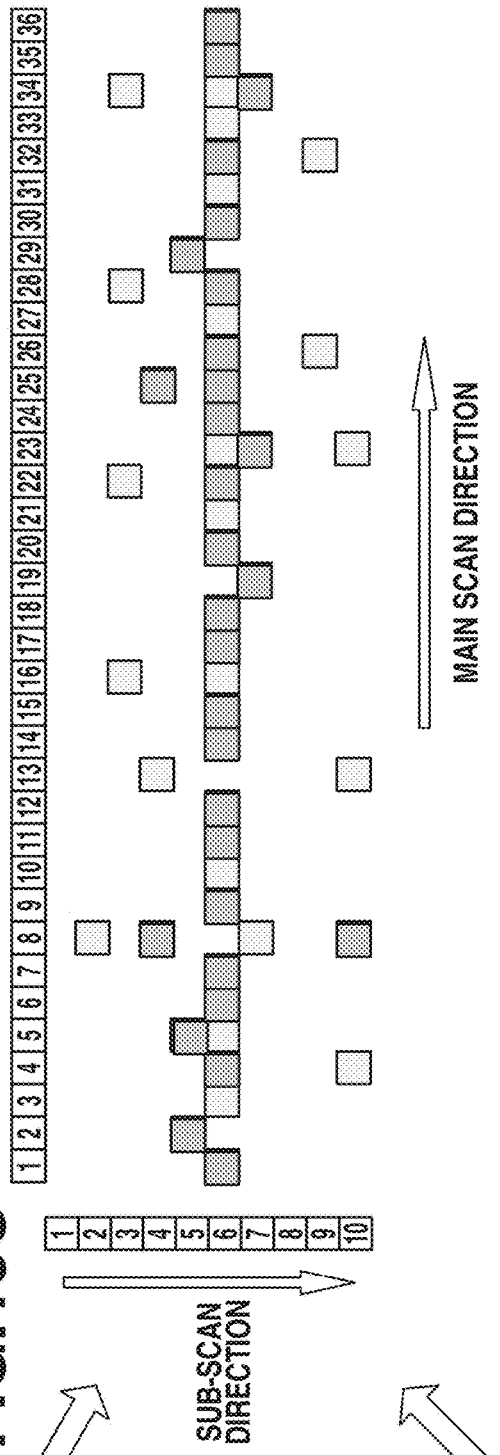
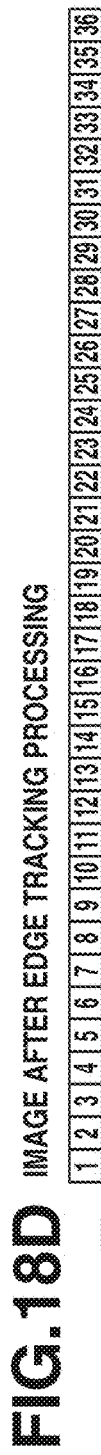
FIG.18C IMAGE AFTER IMAGE COMBINING
FIG.18D IMAGE AFTER EDGE TRACKING PROCESSING

IMAGE READING APPARATUS AND METHOD CONFIGURED TO CORRECT TILT IMAGE DATA

BACKGROUND

Field of the Disclosure

The present disclosure relates to image reading apparatuses and methods of controlling the same.

Description of the Related Art

Japanese Patent Application Laid-Open No. 2017-112412 discusses an image reading apparatus configured to correct a tilt of image data generated by reading an image of a tilted document. Specifically, the image reading apparatus detects an edge of a leading periphery portion of the document and corrects the tilt of the image data based on a tilt of the detected edge.

Further, Japanese Patent Application Laid-Open No. 2014-239367 discusses an image reading apparatus configured to filter image data generated by reading an image of a document, binarize the filtered image data, and detect an edge from the binarized image data.

In a case where an edge of a leading periphery of a document is to be detected to correct a tilt of image data as in Japanese Patent Application Laid-Open No. 2017-112412, the detection accuracy is expected to increase if the edge is detected from image data generated by binarizing filtered image data as in Japanese Patent Application Laid-Open No. 2014-239367.

By binarizing the filtered image data, noise contained in the filtered image data can be removed. However, there may be a case where the edge of the leading periphery of the document does not appear strongly, depending on how the image of the document is read. In this case, not only the noise but also the edge of the leading periphery of the document may be removed by the binarization processing, and the accuracy of the processing of correcting the tilt of the image data may decrease.

SUMMARY

Some embodiments are directed to a technique for increasing the accuracy of edge detection processing for correcting a tilt of image data.

According to some embodiments, an image reading apparatus configured to perform correction processing to correct a tilt of an image based on an edge detected from image data includes a reading unit configured to read an image of a document and generate image data, a filtering unit configured to perform filtering processing on the image data generated by the reading unit and generate image data, a binarization unit configured to perform binarization processing based on the image data generated by the filtering unit using a first threshold value to generate first binary image data, and perform binarization processing based on the image data generated by the filtering unit using a second threshold value to generate second binary image data, and a detection unit configured to detect an edge in the image data generated by the reading unit based on the first binary image data and the second binary image data generated by the binarization unit.

Further features of various embodiments will become apparent from the following description of exemplary embodiments with reference to the attached drawings.

BRIEF DESCRIPTION OF THE DRAWINGS

FIGS. 5A, 5B, 5C, and 5D each illustrate an example of a process of edge detection and determination according to the exemplary embodiment.

FIG. 17 illustrates an example of image processing with two threshold values set according to the exemplary embodiment.

FIGS. 18A to 18D illustrate an example of a process of extracting a common edge from the pieces of image data binarized based on the two threshold values according to the exemplary embodiment.

DESCRIPTION OF THE EMBODIMENTS

Various exemplary embodiments will be described below with reference to the drawings. It should be noted that each configuration described in the exemplary embodiments below is a mere example and some embodiments are not limited to the illustrated configurations.

<Configuration of Scanner>

Figure 1:
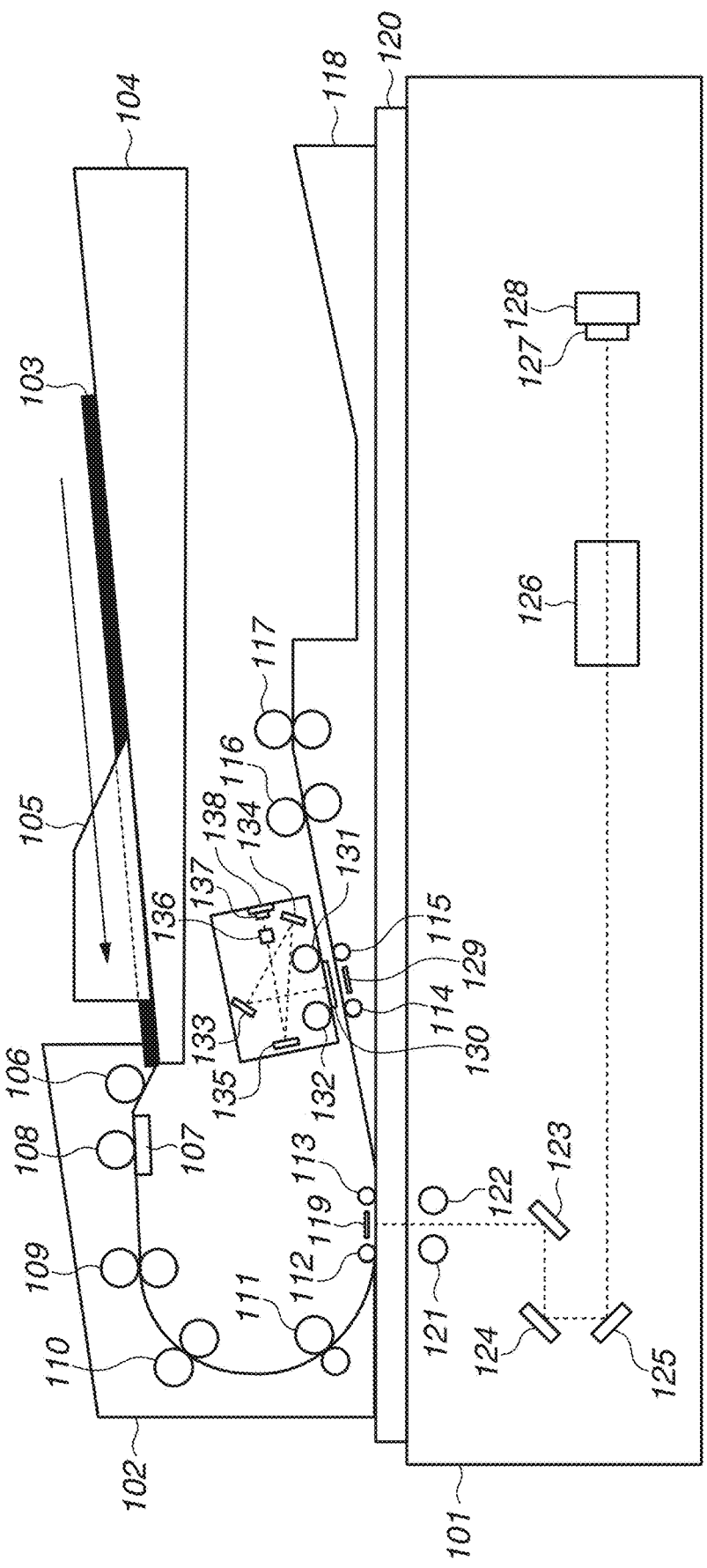
FIG. 1 illustrates an example of a cross-sectional view of a scanner according to an exemplary embodiment.

FIG. 1 illustrates an example of a cross-sectional view of a scanner 100 according to an exemplary embodiment. The scanner 100 is a document reading apparatus that includes a reader unit 101 and an automatic document feeding apparatus (hereinafter, "ADF") 102. The reader unit 101 reads a document image, and the ADF 102 feeds a document.

A bundle of documents 103 is placed on a document tray 104, and is brought into contact with a width regulation plate 105 so that the documents 103 are prevented from being conveyed obliquely.

The bundle of documents 103 is conveyed to a separation portion by a pickup roller 106. At the separation portion, a separation pad 107 and a separation roller 108 separate the bundle of documents 103 one by one from the uppermost document thereof.

A first registration roller 109 corrects the separated document that is obliquely conveyed, and the corrected document is conveyed to a second registration roller 110, a first sheet conveyance roller 111, a second sheet conveyance roller 112, and a third sheet conveyance roller 113 in this order.

When the document is conveyed through the second sheet conveyance roller 112 and the third sheet conveyance roller 113, the document is conveyed over a first reading position, and an image on a front surface of the document is acquired.

After being conveyed through the third sheet conveyance roller 113, the document is conveyed by a fourth sheet conveyance roller 114 and a fifth sheet conveyance roller 115. At this time, the document is conveyed over a second reading position, and information about an image on a back surface of the document is acquired.

Thereafter, the document is conveyed by a sixth sheet conveyance roller 116 and a sheet discharge roller 117 and discharged onto a document discharge tray 118.

Next, an operation of reading an image on a front surface of a document will be described below.

While the document is conveyed between a white facing member 119 and a reading glass 120 at the first reading position, light sources 121 and 122 irradiate the document with light, and the reflection light is guided to an image forming lens 126 by reflection mirrors 123, 124, and 125.

The light converged by the image forming lens 126 is formed into an image by a line sensor 127 including image sensors, such as complementary metal oxide semiconductor (CMOS) image sensors, arranged in a line. The formed optical signal is converted into an electric signal by the line sensor 127, and the electric signal is converted into a digital signal by a signal processing board 128. Then, image processing is performed on the digital signal.

Next, an operation of reading an image on a back surface of a document will be described below.

While the document is conveyed between a white facing member 129 and a back surface reading glass 130 at the second reading position, light sources 131 and 132 irradiate the document with light, and the reflection light is guided to an image forming lens 136 by reflection mirrors 133, 134, and 135.

The light converged by the image forming lens 136 is formed into an image by a line sensor 137 including image sensors arranged in a line, as on the front surface. The formed optical signal is converted into an electric signal by the line sensor 137, and the electric signal is converted into a digital signal by a signal processing board 138. Then, image processing is performed on the digital signal.

In general, the same reading unit is used both in a case where a front surface of a document is read by a moving reading operation, in which an image is read while the document is conveyed, and in a case where a front surface of a document is read by a press-plate reading operation, in which the document is placed on the reading glass 120 and read. In the press-plate reading operation, the light sources 121 and 122 and the reflection mirror 123 are moved rightward from the left in FIG. 1 so that the document on the reading glass 120 is read.

On the other hand, a reading unit configured to read a back surface of a document by the moving reading operation is fixed to a housing of the ADF 102 because the reading unit does not have to be moved.

<Configuration of Control Unit of Scanner>

Figure 2:
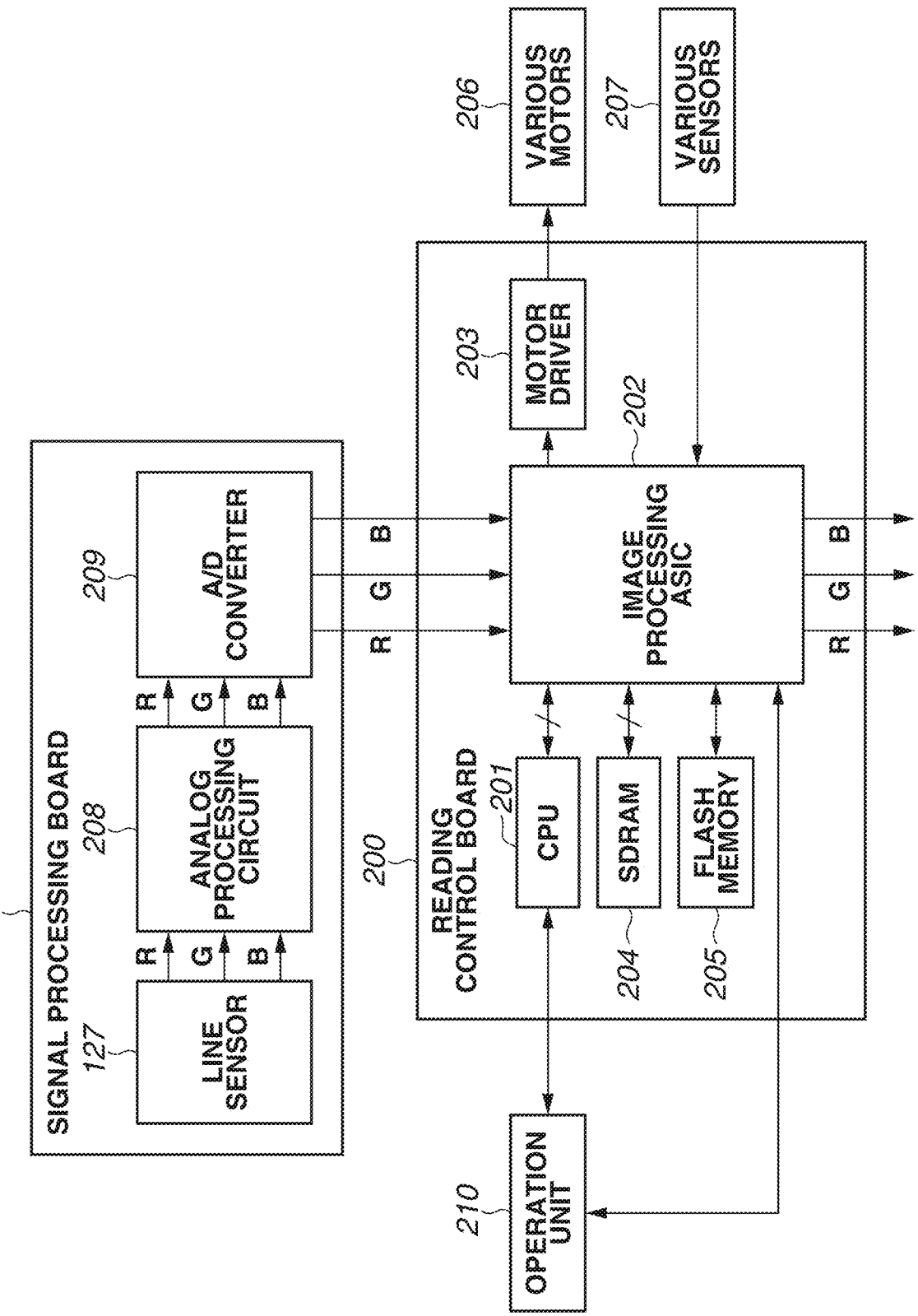
FIG. 2 illustrates an example of a configuration of a reading control board and a signal processing board of the scanner according to the exemplary embodiment.

FIG. 2 illustrates an example of a configuration of a reading control board 200 and the signal processing board 128 of the scanner 100.

On the signal processing board 128 are mounted the line sensor 127, an analog processing circuit 208, and an analog/digital (A/D) converter 209.

Light emitted from the light sources 121 and 122 to a document is reflected and scattered thereon, and the reflected scattered light is photoelectrically converted by the line sensor 127, and the analog processing circuit 208 performs offset and gain adjustment on the photoelectrically-converted analog signal in the optical system illustrated in FIG. 1. The A/D converter 209 converts the analog signal adjusted by the analog processing circuit 208 into a digital signal, and the converted digital image signal is input to an image processing application-specific integrated circuit (image processing ASIC) 202.

On the reading control board 200 are mounted a central processing unit (CPU) 201, the image processing ASIC 202, a motor driver 203, a synchronous dynamic random access memory (SDRAM) 204, and a flash memory 205. Input signals of various sensors 207 and control output signals of various motors 206 in the scanner 100, which are not illustrated in FIG. 1, are controlled by the image processing ASIC 202 or the CPU 201.

The CPU 201 sets various operations of the image processing ASIC 202, and the image processing ASIC 202 performs various types of image processing on the digital image signal input from the A/D converter 209 based on the settings made by the CPU 201. During the image processing, the image processing ASIC 202 transmits and receives various control signals and image signals to and from the SDRAM 204 to temporarily store image signals. Further, some of various setting values and image processing parameters of the image processing ASIC 202 are stored on the flash memory 205, and these values and parameters are read and used as needed.

An instruction from the CPU 201 or input of a sensor signal to the image processing ASIC 202 triggers a start of image processing, and a series of image reading operations is performed by the CPU 201 outputting a control pulse for the various motors 206 to the motor driver 203.

Image data having undergone various types of image processing performed by the image processing ASIC 202 is transmitted to a main control board (not illustrated).

An operation unit 210 is a user interface (UI) operated by the user to display something on a display, input a copy start instruction, or set various settings.

<Configuration of Image Processing Circuit>

Figure 3:
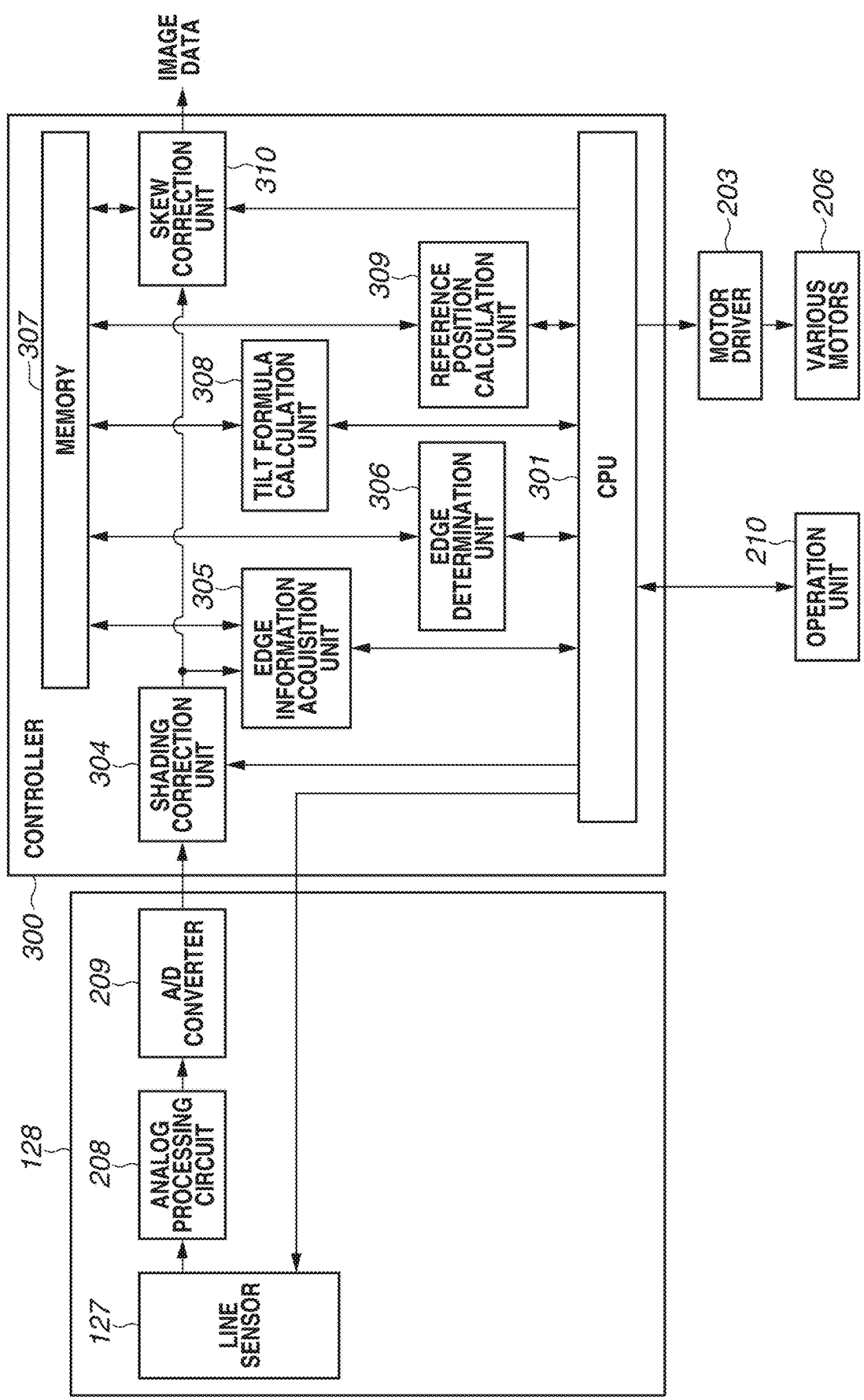
FIG. 3 illustrates an example of a configuration of a controller configured to control operations of the scanner according to the exemplary embodiment.

FIG. 3 illustrates an example of a configuration of a controller configured to control scanner operations.

A controller 300 is part of the image processing ASIC 202 illustrated in FIG. 2, and a CPU 301 of the controller 300 controls document image reading processing of the scanner 100.

The controller 300 includes a shading correction unit 304, an edge information acquisition unit 305, an edge determination unit 306, a memory 307, a tilt formula calculation unit 308, a reference position calculation unit 309, and a skew correction unit 310 to correct a skewed document image. Further, the controller 300 is connected with the various motors 206 and the signal processing board 128 (a light emitting diode (LED) light source (not illustrated) and the line sensor 127) and controls conveyance of the bundle of documents 103 by a document conveyance motor of the various motors 206 and image reading by the signal processing board 128.

The controller 300 acquires analog image data representing a document image from the line sensor 127 via the analog processing circuit 208 and the A/D converter 209 and performs image processing, such as skew correction, on the acquired data to generate image data. The generated image data is used in transmission to a printer unit of a multi-function peripheral, in facsimile transmission, or in transmission to a personal computer.

The operation unit 210 is an input apparatus connected with the controller 300. The operation unit 210 receives a user instruction, such as an instruction to start image reading processing and an instruction to designate a document size, and transmits the received user instruction to the controller 300. Further, the operation unit 210 includes an output apparatus, such as a display, and displays a message under control by the controller 300.

The CPU 301 performs image reading processing by controlling operations of each component of an image reading apparatus. In the image reading processing, the CPU 301 controls emission of light from the LED light source, conveyance of the documents 103 by the document conveyance motor, and photoelectric conversion of received reflection light by the line sensor 127. Further, the CPU 301 performs image reading processing based on a user instruction input from the operation unit 210.

The A/D converter 209 converts analog image data input from the line sensor 127 into digital image data. The shading correction unit 304 processes the digital image data and performs shading correction to correct uneven amounts of light of the LED light source and flatten an effect of pixel sensitivity of the line sensor 127.

The edge information acquisition unit 305 removes random noise originating from variation in reading by the signal processing board 128 based on the digital image data corrected by the shading correction unit 304. Further, the edge information acquisition unit 305 detects a skew amount (tilt) with respect to a main scan direction (width direction) of the document image based on the digital image data corrected by the shading correction unit 304.

The edge information acquisition unit 305 inputs the detected skew amount to the CPU 301. Further, the edge information acquisition unit 305 identifies edge information about an edge portion of the document image based on the digital image data corrected by the shading correction unit 304 and stores the identified edge information on the memory 307.

The edge information acquisition unit 305 can acquire digital image data not only from the shading correction unit 304 directly but also from the memory 307. Details of the edge information acquisition unit 305 will be described below.

The edge determination unit 306 identifies two edge portions of the document image in the main scan direction (width direction) as a left main-scan edge position and a right main-scan edge position and inputs the identified main-scan edge positions to the CPU 301. The edge determination unit 306 acquires the edge information generated by the edge information acquisition unit 305 from the memory 307 and determines edge portions of the document image based on a document edge determination value specified by the CPU 301. The document edge determination value is a threshold value for determining the edge portions of the document image.

The tilt formula calculation unit 308 determines a range for calculation of a linear formula expressing a tilt of the document image based on the left main-scan edge position and the right main-scan edge position determined by the edge determination unit 306. The tilt formula calculation unit 308 acquires data about the range for linear formula calculation based on the edge information acquired from the memory 307 and calculates a linear formula that expresses a skew amount, tilt direction, intercept, and intercept orientation. The tilt formula calculation unit 308 inputs the calculated linear formula to the CPU 301.

The reference position calculation unit 309 inputs one of the positions (corner position) of two corner portions of an image on the front end side of the document 103 in a sheet conveyance direction to the CPU 301 as a reference position in skew correction. The reference position calculation unit 309 calculates accurate corner positions of the document 103 regardless of deterioration of each side of the document 103 and the skew amount of the document 103. Thus, the reference position calculation unit 309 finely adjusts one of the two corner positions of the document 103 on the front side in the sheet conveyance direction to the main scan direction based on the left main-scan edge position or the right main-scan edge position using the edge information and the linear formula.

The reference position calculation unit 309 estimates corner positions of a front portion of the document 103 in the sheet conveyance direction for use as a reference position in skew correction based on the linear formula calculated by the tilt formula calculation unit 308 and the finely-adjusted corner position.

The skew correction unit 310 performs skew correction and position correction on the digital image data based on the skew amount, the tilt direction, and the reference position in skew correction and generates image data. The skew correction unit 310 outputs the generated image data. Further, the skew correction unit 310 stores the digital image data having undergone the shading correction on the memory 307.

Details of the edge information acquisition unit 305, the edge determination unit 306, the tilt formula calculation unit 308, the reference position calculation unit 309, and the skew correction unit 310 will be described below.

Figure 4:
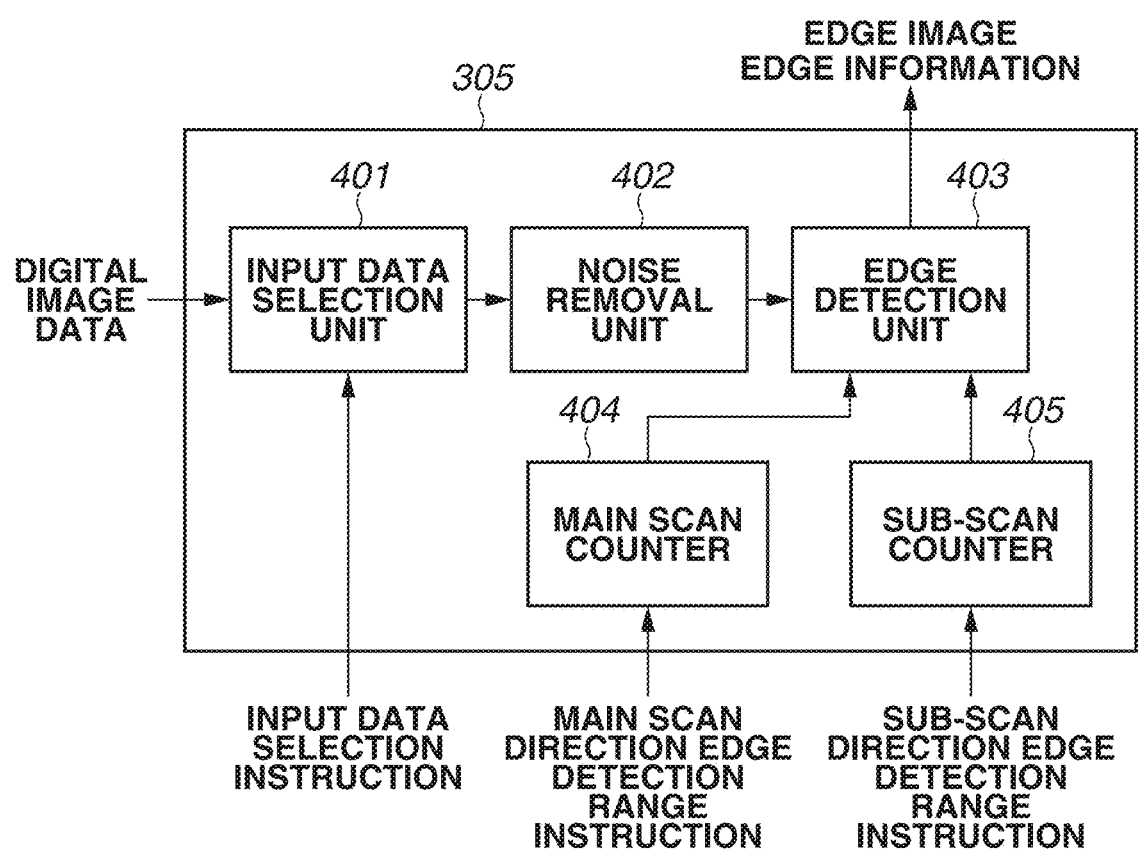
FIG. 4 illustrates an example of a configuration of an edge information acquisition unit according to the exemplary embodiment.

FIG. 4 illustrates an example of a configuration of the edge information acquisition unit 305. The edge information acquisition unit 305 includes an input data selection unit 401, a noise removal unit 402, an edge detection unit 403, a main scan counter 404, and a sub-scan counter 405.

The input data selection unit 401 transmits digital image data acquired from at least one of the shading correction unit 304 and the memory 307 based on an input data selection instruction from the CPU 301 to the noise removal unit 402.

The noise removal unit 402 performs removal processing on the digital image data acquired from the input data selection unit 401 to remove random noise components originating from the signal processing board 128 from the digital image data. A random noise component is sometimes erroneously detected as an edge portion of an image in edge detection processing. Thus, the noise removal unit 402 removes noise components before edge detection.

The noise removal unit 402 employs a commonly-used moving average filter or a bilateral filter capable of removing noise components while retaining an edge image.

The noise removal unit 402 transmits the digital image data on which the noise removal has been performed to the edge detection unit 403.

The edge detection unit 403 performs edge detection processing on the digital image data having been subjected to the noise removal and identifies an edge of the image. A first-order or second-order derivative filter that is a commonly-used edge extraction filter is employed.

The main scan counter 404 controls a range of edge detection in the main scan direction by the edge detection unit 403 based on the edge detection range in the main scan direction (width direction) that is received from the CPU 301.

The sub-scan counter 405 controls a range of edge detection in a sub-scan direction by the edge detection unit 403 based on the edge detection range in the sub-scan direction (the sheet conveyance direction) that is received from the CPU 301.

The edge detection unit 403 detects an edge of the image within the edge detection range set by the main scan counter 404 and the sub-scan counter 405. The edge detection unit 403 stores a detected edge and below-described edge information generated from the edge on the memory 307.

In a case where an edge of a leading periphery of a document is to be detected to correct tilted image data as in Japanese Patent Application Laid-Open No. 2017-112412, a method may be employed in which an edge is detected from image data generated by binarizing filtered image data as in Japanese Patent Application Laid-Open No. 2014-239367 so that the detection accuracy increases.

Noise contained in filtered image data is removed by binarizing the filtered image data. However, there may be a case where an edge of a leading periphery of a document does not appear clearly, depending on how the document image is read. In this case, binarization processing removes not only noise but also the edge of the leading periphery of the document, so that the accuracy of the processing of correcting tilted image data decreases.

To avoid this issue, the below-described processing is performed so that the accuracy of the processing of correcting tilted image data can be increased.

Figure 5A:
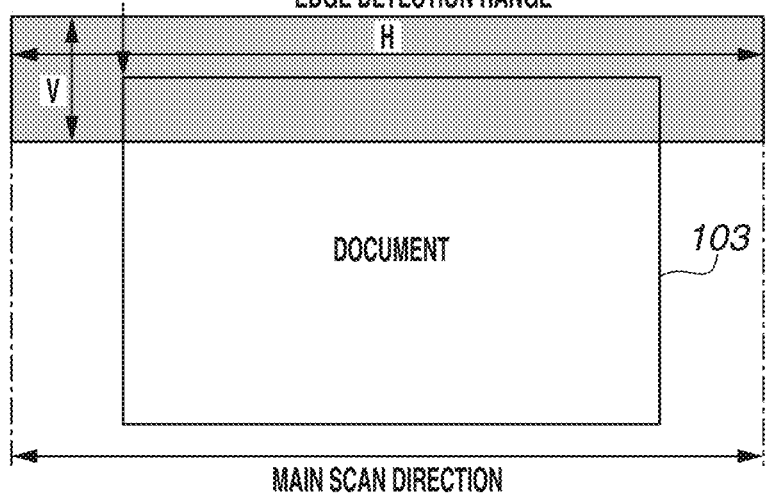
Figure 5B:
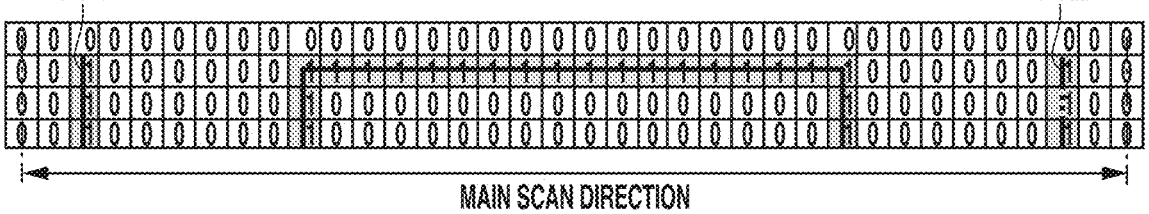

FIGS. 5A to 5D illustrate an example of a process of edge detection and determination. FIG. 5A illustrates the edge detection range of the document image that is set by the main scan counter 404 and the sub-scan counter 405. FIG. 5B illustrates the processing of detecting right/left main-scan edge positions that is performed by the edge determination unit 306. To simplify descriptions, the leftmost pixel is specified as a first pixel and the rightmost pixel as a $36^{th}$ pixel in FIG. 5B.

Further, the edge detection range in the main scan direction that is set by the main scan counter 404 will be referred to as "edge detection range H", and the edge detection range in the sub-scan direction that is set by the sub-scan counter 405 will be referred to as "edge detection range V". A range corresponding to a predetermined number of pixels (predetermined number of lines) is set as the edge detection range V starting from a position before the leading periphery of the document 103 in the sheet conveyance direction.

The edge detection unit 403 detects, for example, a pixel where a color changes from a background color as an edge portion. The edge detection unit 403 binarizes a pixel that is detected as an edge portion to "1"" and a pixel that is not detected as an edge portion to ""0"". Details of the processing performed by the edge detection unit 403 will be described below with reference to FIGS. 16, 17, and 18A to 18D.

Figure 16:
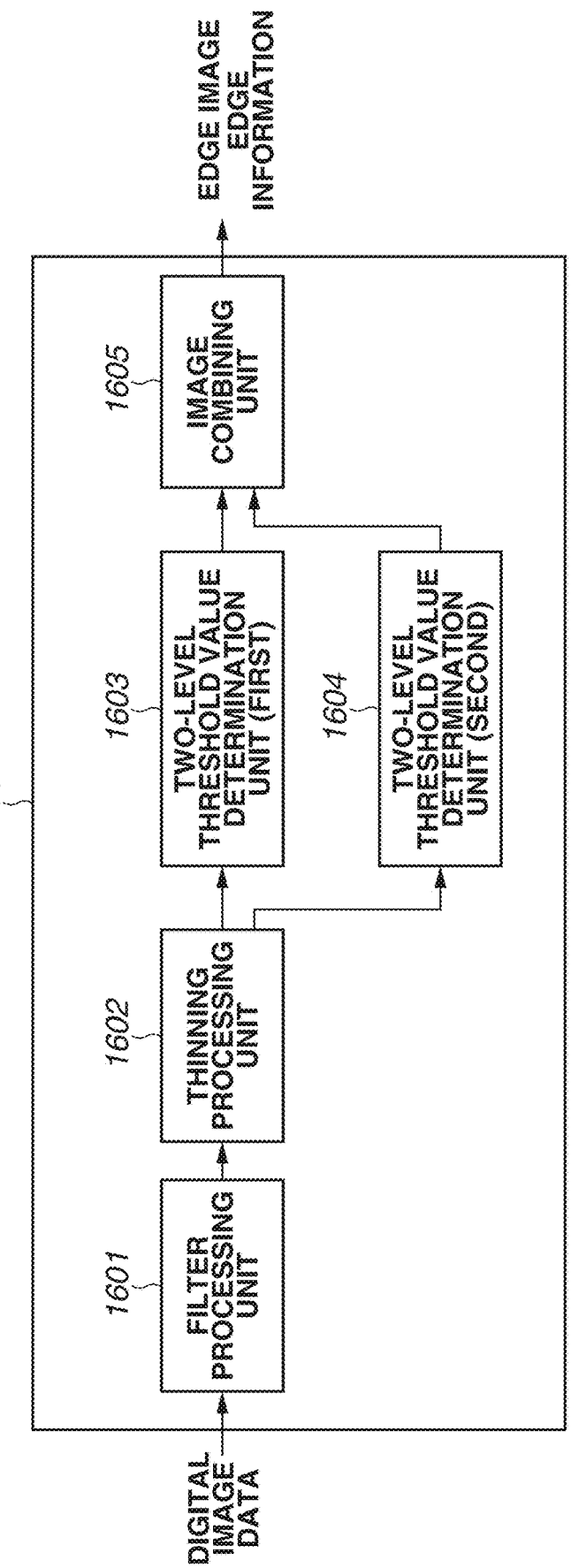
FIG. 16 illustrates an example of a configuration of an edge detection unit according to the exemplary embodiment.

FIG. 16 illustrates an example of a configuration of the edge detection unit 403. The edge detection unit 403 according to the present exemplary embodiment includes a filter processing unit 1601, a thinning processing unit 1602, two-level threshold value determination units 1603 and 1604, and an image combining unit 1605 as illustrated in FIG. 16.

A first-order or second-order derivative filter is often employed as the filter processing unit 1601. A Sobel filter and a Prewitt filter, both known as a first-order derivative filter, performs convolution calculation processing in X- and Y-directions and separately perform edge extraction in the directions. Both results obtained by the separately-performed edge extraction processing are combined together. Then, the central pixel of 3×3 pixels is replaced by a density value calculated by multiplying each of the nine pixels by a predetermined coefficient and combining the products together. With the Sobel filter, "2" is applied to a pixel of a central portion. Thus, the Sobel filter is advantageous in that a low-contrast edge is enhanced, compared to the Prewitt filter.

The operators of the Sobel filter, edge intensity, and edge angle will be respectively expressed in the following formulas (1), (2), (3) and (4).

$$\text{Main scan direction } (X) \ Gx = \begin{bmatrix} -1 & 0 & 1 \\ -2 & 0 & 2 \\ -1 & 0 & 1 \end{bmatrix} \quad \text{formula 1}$$

$$\text{Sub-scan direction } (Y) \ Gy = \begin{bmatrix} -1 & -2 & -1 \\ 0 & 0 & 0 \\ 1 & 2 & 1 \end{bmatrix} \quad \text{formula 2}$$

$$\text{Edge intensity } G = \sqrt{Gx^2 + Gy^2} \quad \text{formula 3}$$

$$\text{Edge angle } \theta = \tan^{-1}\left(\frac{Gy}{Gx}\right) \quad \text{formula 4}$$

A Laplacian filter, which is an example of a second-order derivative filter, does not depend on an edge direction, but the setting of a threshold value for extraction of an edge strongly depends on an edge extraction result, so that the Laplacian filter is more likely to be affected by a disturbance.

In view of the features of the respective filters, the present exemplary embodiment will be further described using an example in which the Sobel filter is applied in order to reduce an effect of a disturbance and to accurately determine a low-contrast image that often emerges at a leading periphery of a document with a light shadow, which are the objectives of some embodiments.

The thinning processing unit 1602 extracts a portion that has the highest intensity in a consecutive edge in the sub-scan direction from the image data from which the edge is extracted by the filter processing unit 1601.

The edge detected by the edge extraction has a great width in a case where a change in the original image is relatively gradual and has a wide range. If the threshold value for edge extraction is increased, the edge width decreases, but a gradual change is likely to be missed. Thus, by widely extracting an edge portion with the threshold value set to a relatively low value and thereafter performing thinning processing, edge extraction can be effectively performed.

A boundary edge between a background portion and a document emerges in a direction (X) orthogonal to the sheet conveyance direction (Y) of the document, so that edge intensities of three pixels in an edge normal direction (Y) are calculated. Then, if the edge intensity of the center of the three pixels is higher than the edge intensities of the two previous and subsequent edges, the central portion is determined as a maximum point edge, and a portion where the edge intensity is not the highest intensity is removed.

As to an edge thinning method, while erosion in morphological transformation has a similar effect, since the direction in which an edge emerges is limited as described above, the above-described processing method is applied in order to prevent an increase in circuit size due to complicated calculations.

The two-level threshold value determination units 1603 and 1604 binarize the image data thinned by the thinning processing unit 1602 using two respectively different threshold values, and generate binary image data.

A threshold value for extracting a strong edge is set to the two-level threshold value determination unit (first) 1603, whereas a threshold value for extracting a weak edge is set to the two-level threshold value determination unit (second) 1604.

FIG. 17 illustrates an example of image processing with two threshold values set. As a result of the edge extraction on input image data using the Sobel filter, not only a boundary edge between a background portion and a leading periphery portion of a document but also an edge containing noise components in the background portion and the document are extracted. The noise components are, for example, dirt in the background portion, the flicker of a light source, and noise originating from the line sensor 127, and in this state it is difficult to accurately discriminate the boundary edge because the document edge portion and the noise components are observed as being locally continuous with each other.

Furthermore, even if the thinning processing unit 1602 performs thinning processing, noise components originating from a sensor and streaks emerging on an image due to an effect of a foreign matter on the line sensor 127 during sheet conveyance are likely to be continuous with each other in the sub-scan direction. Thus, while the thinning processing can remove isolated points separated from the surroundings as noise components, such noise components that are continuous with the surroundings cannot be completely removed by the thinning processing.

Thus, the thinned image data is binarized based on strong and weak edge determination threshold values that are respectively set to the two-level threshold value determination units 1603 and 1604. The binarization based on the strong edge determination threshold value has a strong effect of removing noise components, but an edge of a leading periphery portion of a document is likely to become discontinuous. On the other hand, the binarization based on the weak edge determination threshold value has a weak effect of removing noise components, but an edge of a leading periphery portion of a document remains and the continuity of the edge is likely to be retained. The two threshold values are, for example, threshold values for binarizing image data generated by scanning and for determining whether a pixel is to be determined as a black pixel or a white pixel based on a luminance value of the generated image data. For example, the threshold value for determining a weak edge is set to about 128 in the range of 0 to 255 so that a pixel with a low luminance value will also be determined as a white pixel (edge). Further, the threshold value for determining a strong edge is set to about 192 in the range of 0 to 255 so that only a pixel with a high luminance value will be determined as a white pixel (edge). In general, a portion near a background portion or a ground of a document has a low luminance value, and a portion closer to a shadow portion or a periphery portion of a document has a higher luminance value. The luminance values described herein refer to a luminance value of the filtered image data. Thus, a pixel having a great luminance difference from a nearby pixel is expressed by a color close to white whereas a pixel having a small luminance difference is expressed by a color close to black in the image data before being filtered. The threshold values described herein are mere examples, and any values can be employed as long as the threshold value for weak edge determination is lower than the threshold value for strong edge determination.

The image combining unit 1605 performs the below-described processing on the two pieces of image data binarized by the two-level threshold value determination units 1603 and 1604. Specifically, only a portion that is to be connected with the image data binarized based on the threshold value for strong edge determination in the image data binarized based on the threshold value for weak edge determination is determined as an edge portion, and a portion that is not to be connected is removed.

In a result of the binarization based on the strong edge determination threshold value, the effect of removing noise effects is strong, but the continuity of an edge is sacrificed. To compensate for the sacrifice, the feature of the binarization based on the weak edge determination threshold value, i.e., noise components are likely to be picked up but the continuity of an edge is retained, is used. Specifically, noise components of a portion other than an edge portion of a leading periphery of a document are less likely to emerge in a result of the binarization based on the strong edge determination threshold value but are likely to emerge in a result of the binarization based on the weak edge determination threshold value. Thus, the noise components can be removed by combining the results. On the other hand, an edge portion of a leading periphery of a document is likely to be discontinuous in a result of the binarization based on the strong edge determination threshold value but is likely to be continuous in a result of the binarization based on the weak edge determination threshold value, and a continuous edge is obtained by combining the results so that the continuity of the edge portion is retained.

FIGS. 18A to 18D illustrate an example of a process of extracting a common edge from the pieces of image data binarized based on the two threshold values.

FIG. 18A illustrates image data binarized based on the threshold value for weak edge determination. FIG. 18B illustrates image data binarized based on the threshold value for strong edge determination. FIG. 18C illustrates image data generated by combining the image data in FIG. 18A and the image data in FIG. 18B based on the same coordinates. FIG. 18D illustrates an example in which edge tracking processing is performed on the combined image data. To simplify descriptions, a result of edge extraction over a width of 36 pixels in the main scan direction and a width of 10 pixels in the sub-scan direction is illustrated. Further, the edges extracted in FIG. 18A are illustrated in light gray, whereas the edges extracted in FIG. 18B are illustrated in dark gray.

As illustrated in FIG. 18A, an edge portion at the position of the sixth pixel in the sub-scan direction being as the center is extracted in the image data binarized based on the threshold value for weak edge determination, and noise components at some other positions are also recognized as an edge. As illustrated in FIG. 18B, an edge portion at the position of the sixth pixel in the sub-scan direction being as the center is extracted in the image data binarized based on the threshold value for strong edge determination, but the continuity of the edge portion is less likely to be retained. Further, less noise components are recognized as an edge. Therefore, the number of pixels extracted as an edge based on the threshold value for strong edge determination is less than the number of pixels extracted as an edge based on the threshold value for weak edge determination.

In the combined image data in FIG. 18C, when (main scan pixel position, sub-scan pixel position)=(main, sub), strong and weak edges are both extracted at the positions (main, sub)=(1, 6) and (main, sub)=(2, 5), so that the positions in the combined image data are also stored as an edge.

Further, the position (main, sub)=(3, 6) is not extracted as a strong edge but is extracted as a weak edge and is to be connected with the nearby pixels (main, sub)=(2, 5) and (4, 6), so that the position is stored as an edge.

On the other hand, the position (main, sub)=(4, 10) is not extracted as a strong edge but is extracted as a weak edge and is not to be connected with any nearby pixels, so that the position is determined as a noise component and removed. Specifically, the pixel value at the position is set to zero. The above-described edge tracking processing is continued so that the image illustrated in FIG. 18D is obtained.

Further, in order to identify an isolated pixel that is not adjacent to any pixels as an edge, a pixel in a straight line consisting of a group of pixels identified as an edge can be identified as an edge.

The process illustrated in FIGS. 18A to 18D can be executed by reading a program stored on a read-only memory (ROM) (not illustrated) onto the memory 307 by the CPU 301.

The above-described processing is executed so that the accuracy of edge detection processing for correcting a tilt in image data increases.

Figure 5C:

The edges detected in an edge detection range (H, V) are illustrated in FIG. 5B. The image combining unit 1605 of the edge detection unit 403 performs an OR operation in the sub-scan direction for each position in the main scan direction based on the information acquired in the edge detection range. Then, the image combining unit 1605 calculates an operation result such that a pixel from which an edge image is detected at least once is "1" and a pixel from which an edge is not detected even once is "0" for each pixel in the main scan direction. The results of the OR operations indicate the presence or absence of an edge at each position in the main scan direction. The results of the OR operations are illustrated in FIG. 5C. The edge detection unit 403 stores the results of the OR operations as edge information on the memory 307.

The edge determination unit 306 acquires the edge information generated by the edge detection unit 403 from the memory 307 and detects right and left main-scan edge positions based on the edge information.

The edge determination unit 306 checks the edge information about each pixel from both directions in the main scan direction and detects each periphery portion of an edge image in the main scan direction. In a case where there are a predetermined number of consecutive pixels with the value of "1" set in the edge information, the edge determination unit 306 determines the pixel at the head as a main scan edge position.

The predetermined number of consecutive pixels is set as a document edge determination value to the edge determination unit 306 by the CPU 301. The edge determination unit 306 includes an edge counter (not illustrated) of a left periphery and an edge counter (not illustrated) of a right periphery portion and counts the number of consecutive pixels with the value "1".

The edge determination unit 306 stores the pixels with the value "1" as main scan edge positions, and if a pixel with the value "0" is detected, the edge determination unit 306 replace the count value with "0" and also clears the main scan edge positions.

In a case where a portion other than the edge portions is determined as an edge due to dirt on a background portion or a noise component superimposed on an image, a discontinuity arises in counter values, so that the edge determination unit 306 clears the stored left main-scan edge position and sets "0" to the count value of the edge counter of the left periphery portion. The term "left main-scan edge position" refers to an edge position detected in a search from the left of a document in the main scan direction, and the term "right main-scan edge position" refers to an edge position detected in a search from the right of the document in the main scan direction.

Then, the edge determination unit 306 latches an edge position detected after the count value is set to "0" and sets the count value of the edge counter of the left periphery portion to "1". There are consecutive pixels with the value "1" up to the position of the right periphery of the edge image.

Specifically, the counting is conducted as illustrated in FIG. 5D. In the example in FIG. 5B, the third pixel from the left periphery portion has the value "1", so that the edge determination unit 306 stores the third pixel as a left main-scan edge position and sets the count value of the edge counter of the left periphery portion of the document to "1". However, the value of the fourth pixel is "0", so that the edge determination unit 306 clears the stored left main-scan edge position and sets the count value of the edge counter of the left periphery portion to "0".

Next, the tenth pixel from the left periphery portion has the value "1", so that the edge determination unit 306 stores the tenth pixel as a left main-scan edge position and sets "1" to the count value of the edge counter of the left periphery portion of the document. There are consecutive pixels with the value "1" up to the $27^{th}$ pixel.

In the example in FIG. 5B, the document edge determination value is "5", so that the edge determination unit 306 determines a pixel of the left main-scan edge position that is stored at the time when the value of the $15^{th}$ pixel is checked as an edge portion of the left periphery portion of the image.

Next, a process of determining an edge position of a right periphery portion will be described below. In the example in FIG. 5B, the $34^{th}$ pixel from the left periphery portion has the value "1", so that the edge determination unit 306 stores the $34^{th}$ pixel as a right main-scan edge position and sets "1" to the count value of the edge counter of the right periphery portion of the document to. However, the value of the $33^{rd}$ pixel from the left periphery portion is "0", so that the edge determination unit 306 clears the stored right main-scan edge position and sets "0" to the count value of the edge counter of the right periphery portion of the document. The value of the $27^{th}$ pixel from the left periphery portion is "1", so that the edge determination unit 306 stores the $27^{th}$ pixel as a right main-scan edge position and sets "1" to the count value of the edge counter of the right periphery portion of the document. There are consecutive pixels with the value "1" up to the tenth pixel from the left periphery portion.

In the example in FIG. 5B, the document edge determination value is "5", so that the edge determination unit 306 determines a pixel of the right main-scan edge position that is stored at the time when the value of the $23^{rd}$ pixel from the left periphery portion is checked as an edge position of the right periphery portion of the image.

As described above, in a case where there are consecutive pixels with the value "1" and the number of the consecutive pixels is equal to a predetermined number specified by the CPU 301, the edge determination unit 306 determines that the head pixel is not a quasi-edge originating from dirt on a background portion or a noise component but an edge portion of the read document image.

The edge determination unit 306 determines a document start position at the left periphery portion and a document end position at the right periphery portion and transmits the results of determination of the main scan edge positions at the right and left periphery portions to the CPU 301.

Figure 6:
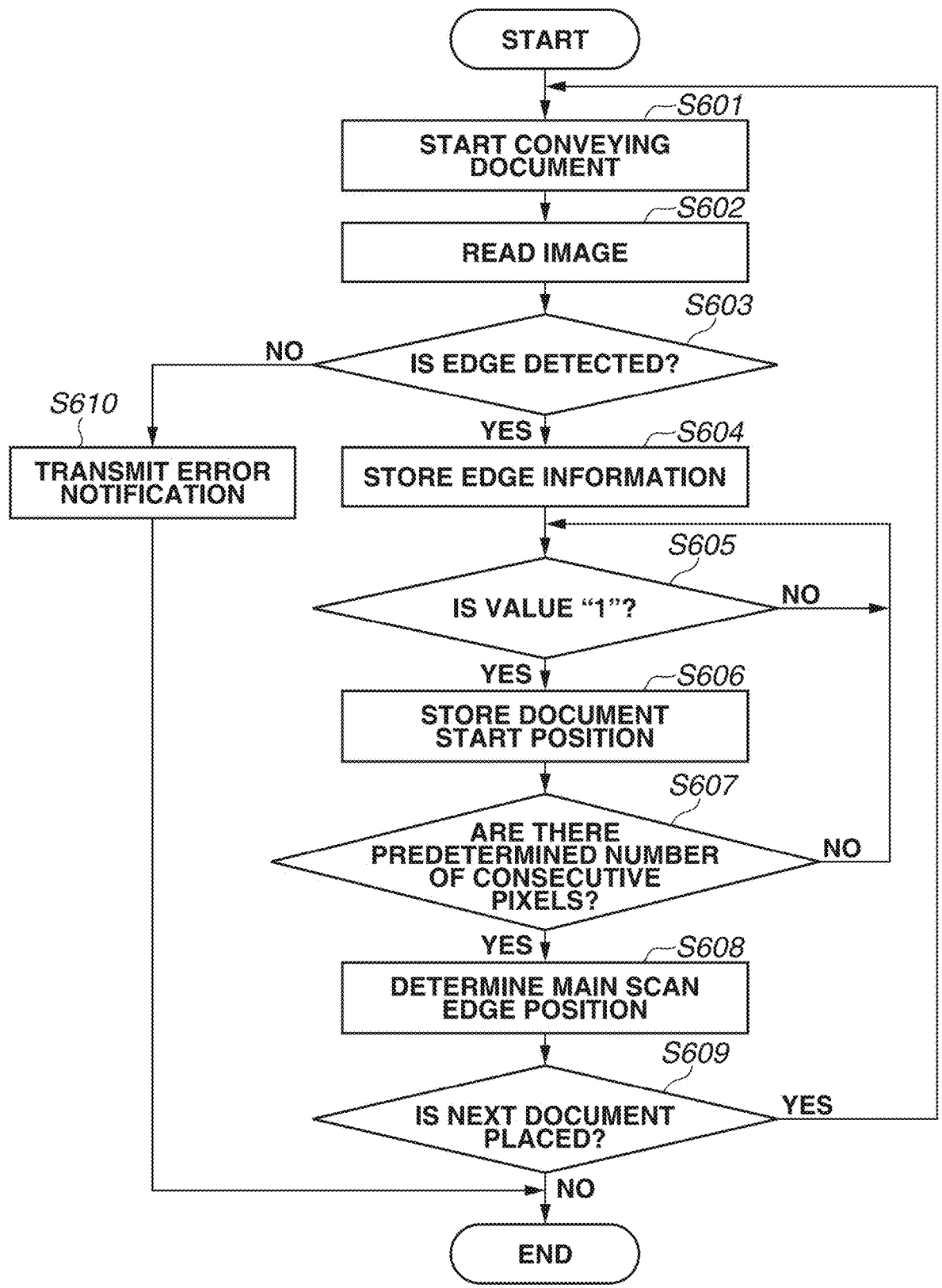
FIG. 6 is a flowchart illustrating a process of determining right and left main scan edge positions of an image according to the exemplary embodiment.

FIG. 6 is a flowchart illustrating a process of determining right and left main scan edge positions of an image. The process illustrated in FIG. 6 is executed based on a user instruction to start image reading processing from the operation unit 210. The process in the flowchart in FIG. 6 is executed by CPU 301 controlling each piece of hardware. Alternatively, the process in the flowchart in FIG. 6 may be executed by the CPU 301 by reading a program stored on the ROM (not illustrated) onto the memory 307 and executing the read program.

In S601, if the CPU 301 receives an instruction to start image reading processing from the operation unit 210, the CPU 301 controls the document conveyance motor of the various motors 206 and starts conveying the document 103.

In S602, the CPU 301 controls the signal processing board 128, reads an image on the conveyed document 103, and acquires digital image data.

In S603, the CPU 301 controls the edge information acquisition unit 305, and detects an edge from the digital image data acquired in S602 by the edge detection unit 403.

In S603, in a case where the CPU 301 determines that an edge is detected (YES in S603), the processing proceeds to S604. On the other hand, in a case where the CPU 301 determines that no edge is detected (NO in S603), the processing proceeds to S610.

In S604, the CPU 301 controls the edge detection unit 403, generates edge information, and stores the edge information on the memory 307.

In S610, the CPU 301 determines that an error occurs in the scanner 100, and the CPU 301 transmits an error notification to the operation unit 210, and the operation unit 210 then displays information indicating the error.

In S605, the CPU 301 controls the edge determination unit 306, acquires the edge information from the memory 307, and searches for right and left main-scan edge positions of the image. In the search, the edge determination unit 306 checks a pixel with the value "1" based on the edge information.

In S605, the CPU 301 controls the edge determination unit 306, and in a case where a pixel with the value "1" is detected (YES in S605), the processing proceeds to S606. On the other hand, in a case where a pixel with the value "1" is not detected (NO in S605), the processing returns to S605.

In S606, the CPU 301 controls the edge determination unit 306 and stores the pixel with the value "1" as a document start position. The document start position can be stored on the memory 307 or on a latch circuit.

In S607, the CPU 301 controls the edge determination unit 306 and determines whether there are a predetermined number of consecutive pixels with the value "1". In the present exemplary embodiment, the CPU 301 determines whether there are five consecutive pixels with the value "1". In a case where the CPU 301 determines that there are the predetermined number of consecutive pixels with the value "1" (YES in S607), the processing proceeds to S608. Otherwise (NO in S607), the processing returns to S605.

In S608, the CPU 301 controls the edge determination unit 306 and determines the pixel stored in S606 as a main scan edge position.

In S609, the CPU 301 determines whether a next document 103 is placed. In a case where the CPU 301 determines that a next document 103 is placed (YES in S609), the processing returns to S601. Otherwise (NO in S609), the process is ended. The document tray 104 includes, for example, a sensor configured to detect a document 103 placed thereon. The CPU 301 can determine whether a next document 103 is placed on the document tray 104 based on a result of detection by the sensor.

The CPU 301 controls the edge determination unit 306 and performs the processes in S605 to S608 from the left and from the right in the main scan direction to thereby determine right and left main scan edge positions.

The CPU 301 controls the edge information acquisition unit 305 and the edge detection unit 403 detects an edge of the document image in the sub-scan direction. The detection of an edge image of the document 103 in the sub-scan direction by the edge detection unit 403, i.e., the processing of detecting an edge of a leading periphery in the sheet conveyance direction, will be described below.

Due to the positional relationship between light from the light sources 131 and 132 and the conveyed document 103, a shadow is generated on the leading periphery portion of the document 103 in the sheet conveyance direction. The shadow has a certain amount of width in the sheet conveyance direction.

For accurate skew correction of the leading periphery of the document 103 in the sheet conveyance direction, an edge image in the sub-scan direction needs to be accurately detected from the document image.

Figure 7:
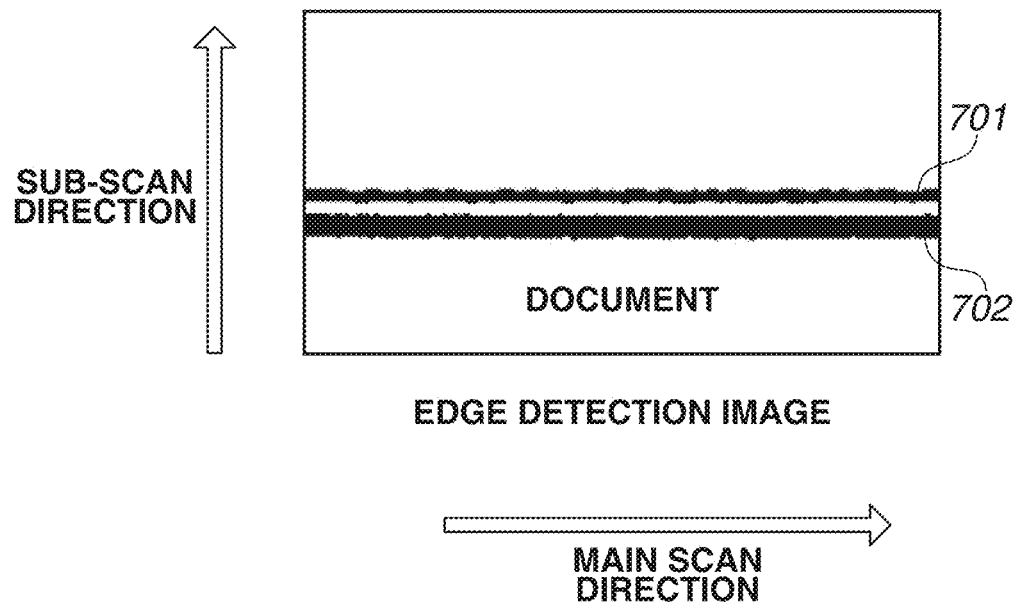
FIG. 7 illustrates an example of a relationship between a shadow on a document and an edge of a leading periphery of the document in a sheet conveyance direction according to the exemplary embodiment.

FIG. 7 illustrates an example of the relationship between a shadow of a document and an edge of a leading periphery of the document in the sheet conveyance direction. The edge detection unit 403 detects an edge generated by the shadow as a shadow portion edge 701 and a portion where a shadow portion changes to a document portion as a document portion edge 702. As described above, the shadow portion edge 701 and the document portion edge 702 are doubly detected by the edge detection unit 403.

This situation occurs because in a case where a shadow is generated with a great width, the luminance of the shadow portion is likely to be stable, although it depends on a detection local region (filter size) in edge detection, so that it is determined that there is no edge change in the detection local region (filter size).

For accurate edge detection from the document image, the edge detection unit 403 checks an edge detection result in the sub-scan direction and detects the second edge change (value change from "0" to "1") position (pixel) as the document portion edge 702.

Further, there may be a case where no shadow portion edge image 701 is detected. In this case, an edge image emerges as a single edge image. The edge detection unit 403 stores the first edge change (change from "0" to "1") position (pixel) and checks whether there is an edge change in a predetermined number of pixels from the stored position in the sub-scan direction. If there is no edge change, the edge detection unit 403 detects the stored position as the document portion edge 702. The document portion edge 702 is determined as an edge position (sub-scan edge position) of the document image in the sub-scan direction.

Figure 8:
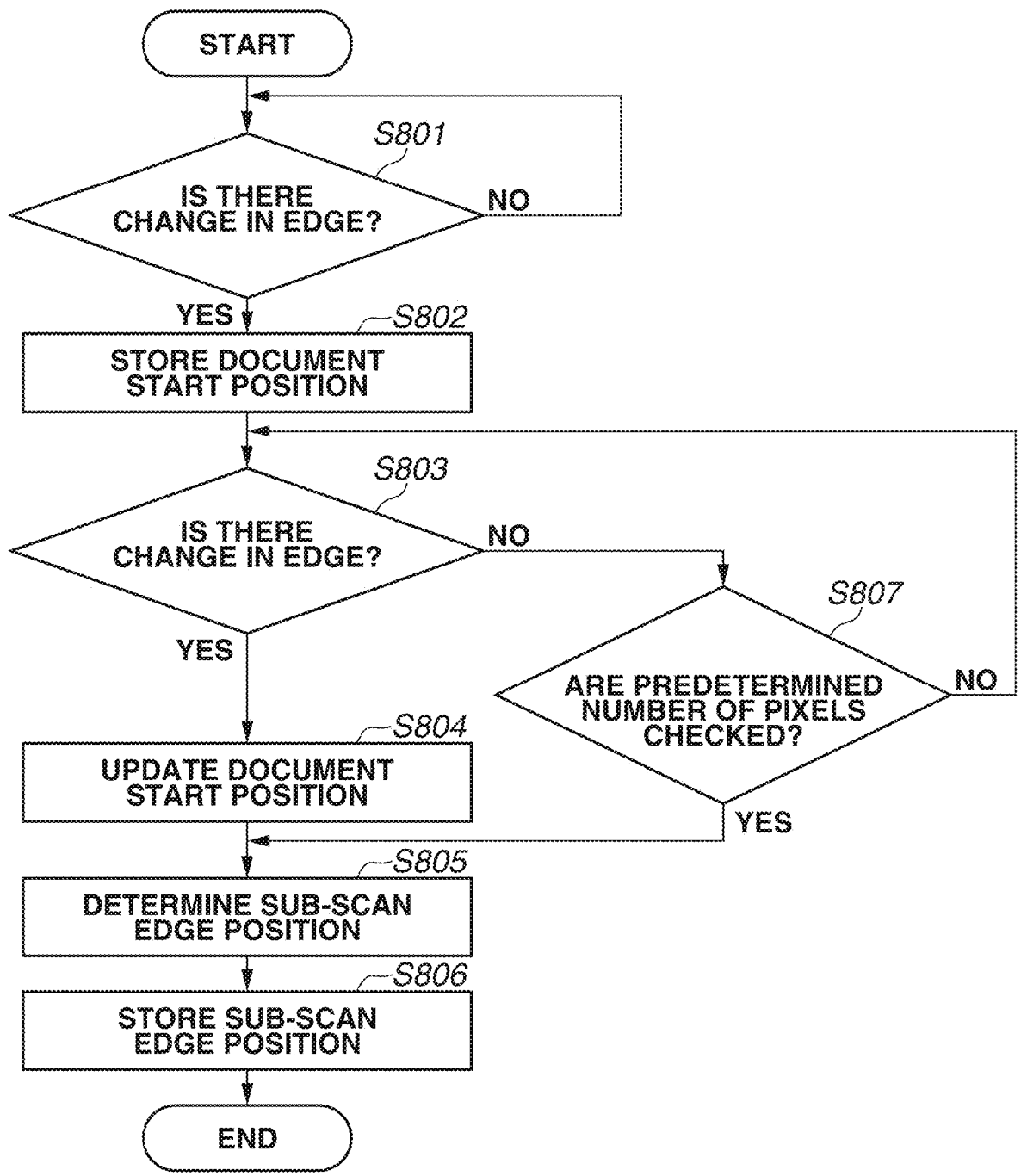
FIG. 8 is a flowchart illustrating an example of a process of detecting an edge position in a sub-scan direction according to the exemplary embodiment.

FIG. 8 is a flowchart illustrating an example of a process of detecting an edge position in the sub-scan direction. The process in FIG. 8 is executed using the edge detection result generated by the edge detection from the digital image data by the edge detection unit 403 in S603. The CPU 301 controls each piece of hardware so that the process in the flowchart in FIG. 8 is executed. Alternatively, the process in the flowchart in FIG. 8 may be executed by the CPU 301 by reading a program stored on the ROM (not illustrated) onto the memory 307 and executing the read program.

In S801, the CPU 301 controls the edge detection unit 403 to detect an edge in the sub-scan direction. Then, the CPU 301 checks the value of each pixel, and in a case where there is a value change (change from "0" to "1") (YES in S801), the processing proceeds to S802. Otherwise (NO in S801), the processing returns to S801, and the CPU 301 checks the value of the next pixel in the sub-scan direction.

In S802, the CPU 301 controls the edge detection unit 403 and stores the pixel where the value changes as a document start position in the sub-scan direction.

In S803, the CPU 301 controls the edge detection unit 403 and continues checking the value of each pixel in the sub-scan direction starting with a subsequent pixel of the pixel stored as the document start position. Then, the CPU 301 determines whether there is a value change (change from "0" to "1"). In a case where the CPU 301 determines that there is a value change (YES in S803), the processing proceeds to S804. Otherwise (NO in S803), the processing proceeds to S807.

In S804, the CPU 301 controls the edge detection unit 403 and updates the document start position in the sub-scan direction with the pixel at which the change is detected in S803.

In S807, the CPU 301 controls the edge detection unit 403 and checks whether there is no value change in a predetermined number of pixels in the sub-scan direction. In a case where the predetermined number of pixels are checked (YES in S807), the processing proceeds to S805. On the other hand, in a case where the predetermined number of pixels are not checked (NO in S807), the processing proceeds to S803.

In S805, the CPU 301 controls the edge detection unit 403 and determines the stored pixel as a sub-scan edge position of the document image.

In S806, the CPU 301 controls the edge detection unit 403 and stores the sub-scan edge position determined in S805 on the memory 307. By the above-described process, the sub-scan edge position of the document image is detected.

<Issues in Conventional Method of Edge Detection in Sub-Scan Direction>

A shadow that emerges at a boundary between an image of a document and a background portion varies due to a factor, such as a thin sheet of the document, a varying distance between the document and the background portion due to the conveyance condition of the document, or a decreased signal/noise (S/N) ratio of the read image due to apparatus duration.

Figure 13:
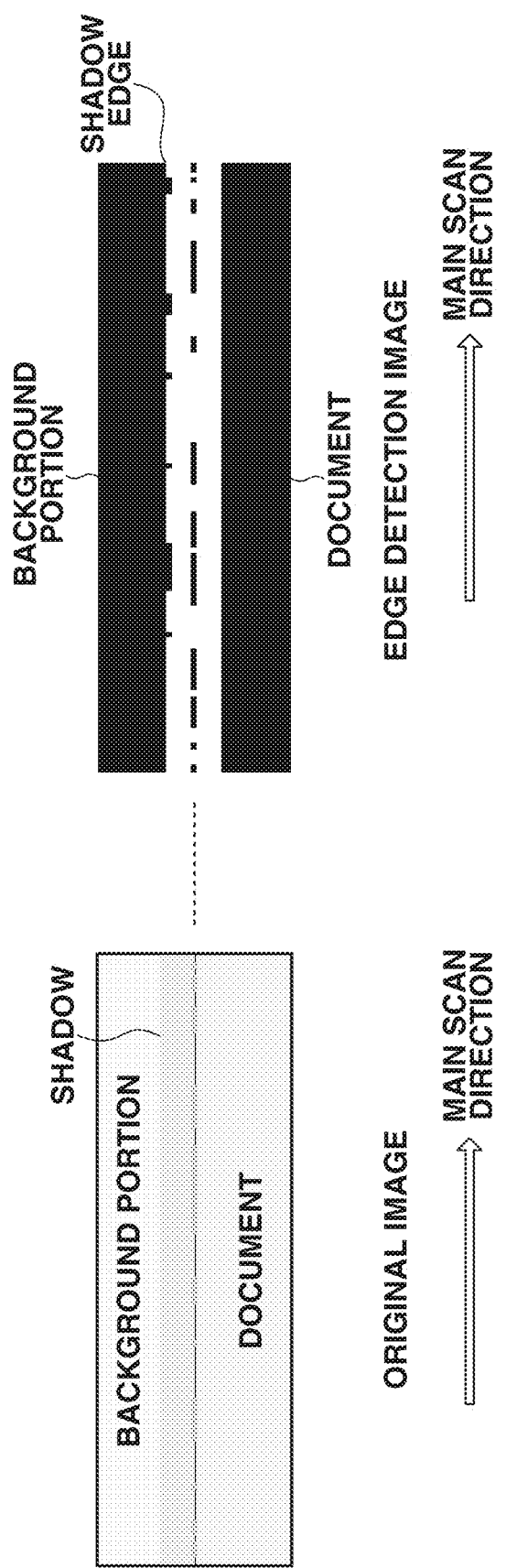
FIG. 13 illustrates an example of a comparison between an original image and an edge detection image in a case where an extremely light shadow emerges at a boundary between an image of a document and a background portion according to the exemplary embodiment.

FIG. 13 illustrates an example of a comparison between an original image and an edge detection image in a case where an extremely light shadow emerges at a boundary between an image of a document and a background portion. In the edge detection image, a portion that is recognized as an edge is illustrated in "white", whereas a portion that is not recognized as an edge is illustrated in "black".

In a case where a shadow emerges with a moderate width, a change point from the background portion to the shadow is recognized as an edge, and then no edge is detected (black) because a luminance change in the shadow region is small. Thereafter, an edge between the shadow and the image of the document is detected (white), and after the document edge detection, no edge is expected to be detected (black).

On the contrary, in a case where an extremely light shadow emerges as illustrated in FIG. 13, a change point from a background portion to a shadow is recognized as an edge in a similar manner to the above, but since the shadow region emerges only within an extremely short range, an edge (white) is consecutively detected between the shadow and the document. In other words, there is a portion from the background portion to the shadow and to the leading periphery of the document that is entirely recognized as an edge, so that it is sometimes difficult to accurately recognize the boundary edge between the shadow and the document.

Furthermore, since a shadow does not emerge uniformly at the boundary with the document, there is sometimes observed a phenomenon where no edge is detected (black) at a portion due to a small luminance change in the shadow region while an edge (white) between the shadow and the document is consecutively detected at a position in the main scan direction.

In such a case, if a second edge change position is detected as a document portion edge image by the processing method as illustrated in FIG. 8, the leading periphery portion of the document is recognized as a second edge at a certain portion. At some other portion, however, a portion within the document beyond the leading periphery portion of the document may be recognized as a second edge, and this leads to a decrease in accuracy of the edge detection of the leading periphery of the document.

Furthermore, the decreased accuracy of the edge detection of the leading periphery of the document can lead to excessive or inverse correction in affine transformation by the skew correction unit 310 described below. To solve the above-described issues, the below-described process is performed.

Method of Edge Detection in Sub-Scan Direction According to Present Exemplary Embodiment According to the present exemplary embodiment, part of the flowchart in FIG. 8 is changed to realize a method of detecting an edge of a leading periphery portion of a document with greater accuracy even in the above-described case.

Figure 14:
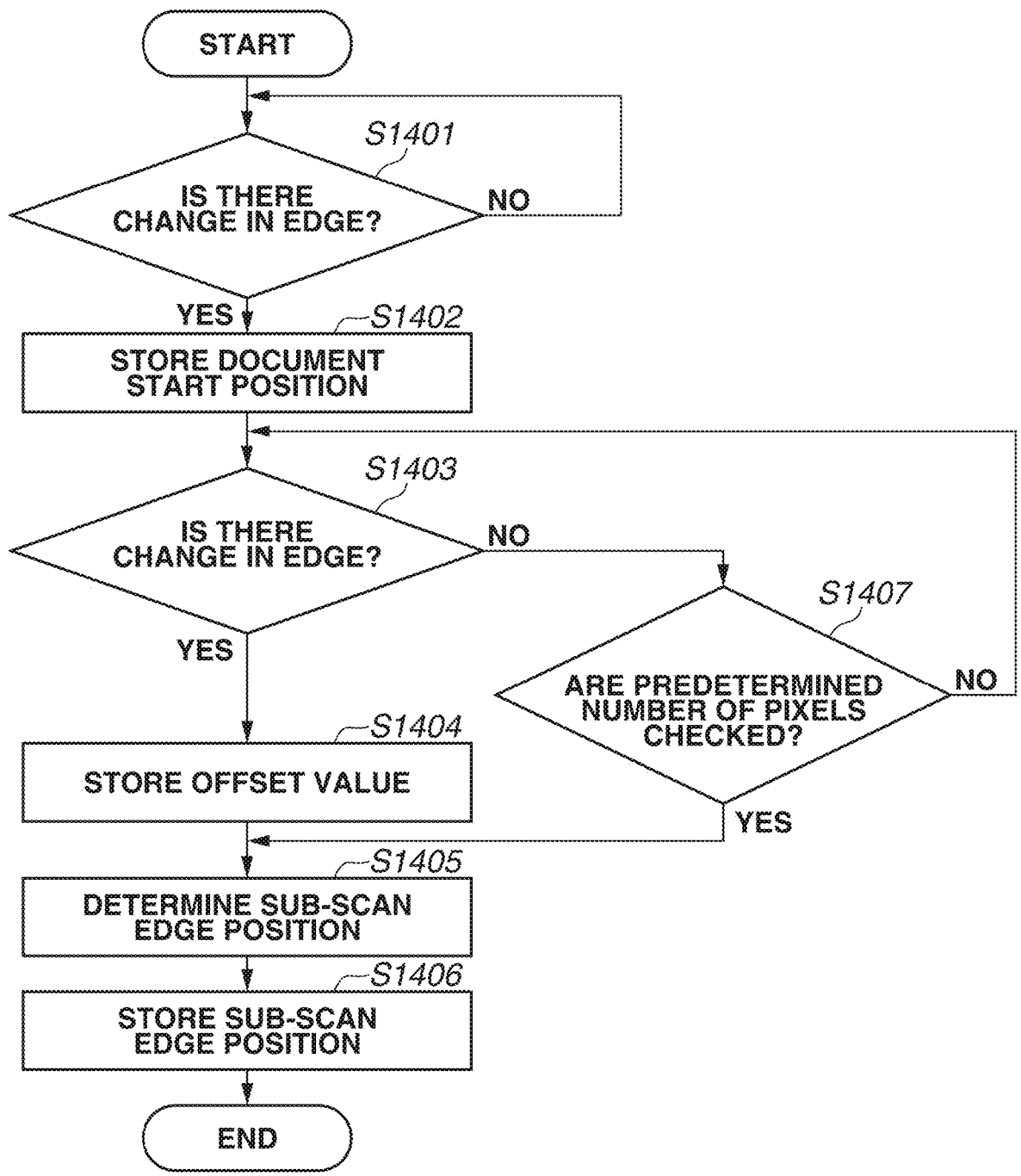
FIG. 14 is a flowchart illustrating an example of a process of detecting an edge position in a sub-scan direction according to the exemplary embodiment.

FIG. 14 is a flowchart illustrating an example of a process of detecting an edge position in the sub-scan direction. The process in FIG. 14 is executed using the edge detection result generated by detecting the edge from the digital image data by the edge detection unit 403 in S603. The CPU 301 controls each piece of hardware so that the process in the flowchart in FIG. 14 is executed. Alternatively, the process in the flowchart in FIG. 14 can be executed by the CPU 301 by reading a program stored on the ROM (not illustrated) onto the memory 307 and executing the read program.

In S1401, the CPU 301 controls the edge detection unit 403 and performs edge detection in the sub-scan direction as in S801. Then, the CPU 301 checks the value of each pixel, and in a case where there is a value change (change from "0" to "1") (YES in S1401), the processing proceeds to S1402.

Otherwise (NO in S1401), the processing returns to S1401, and the CPU 301 checks the value of the next pixel in the sub-scan direction.

In S1402, the CPU 301 controls the edge detection unit 403 and stores the pixel where the value changes as a document start position in the sub-scan direction as in S802.

In S1403, the CPU 301 controls the edge detection unit 403 and continues checking the value of each pixel in the sub-scan direction as in S803. Then, the CPU 301 determines whether there is a value change (change from "0" to "1"). In a case where the CPU 301 determines that there is a value change (YES in S1403), the processing proceeds to S1404. Otherwise (NO in S1403), the processing proceeds to S1407.

In S1404, the CPU 301 controls the edge detection unit 403 and stores a difference value between the position of the pixel where the value changes determined in S1403 and the position stored in S1402 as an offset value, separately from the pixel stored as the document start position in the sub-scan direction in S1402.

In S1407, the CPU 301 controls the edge detection unit 403 and checks whether there is no value change in the predetermined number of pixels in the sub-scan direction as in S1407. In a case where the predetermined number of pixels are checked (YES in S1407), the processing proceeds to S1405. On the other hand, in a case where the predetermined number of pixels are not checked (NO in S1407), the processing returns to S1403.

In S1405, the CPU 301 controls the edge detection unit 403 and determines an edge position in the sub-scan direction based on the pixel position stored in S1402 and the offset value stored in S1404. Details of a method of determining an edge position in the sub-scan direction will be described below.

In S1406, the CPU 301 controls the edge detection unit 403 and stores the edge position in the sub-scan direction that is determined in S1405 on the memory 307. By the above-described process, the edge position in the sub-scan direction is detected.

Figure 15:
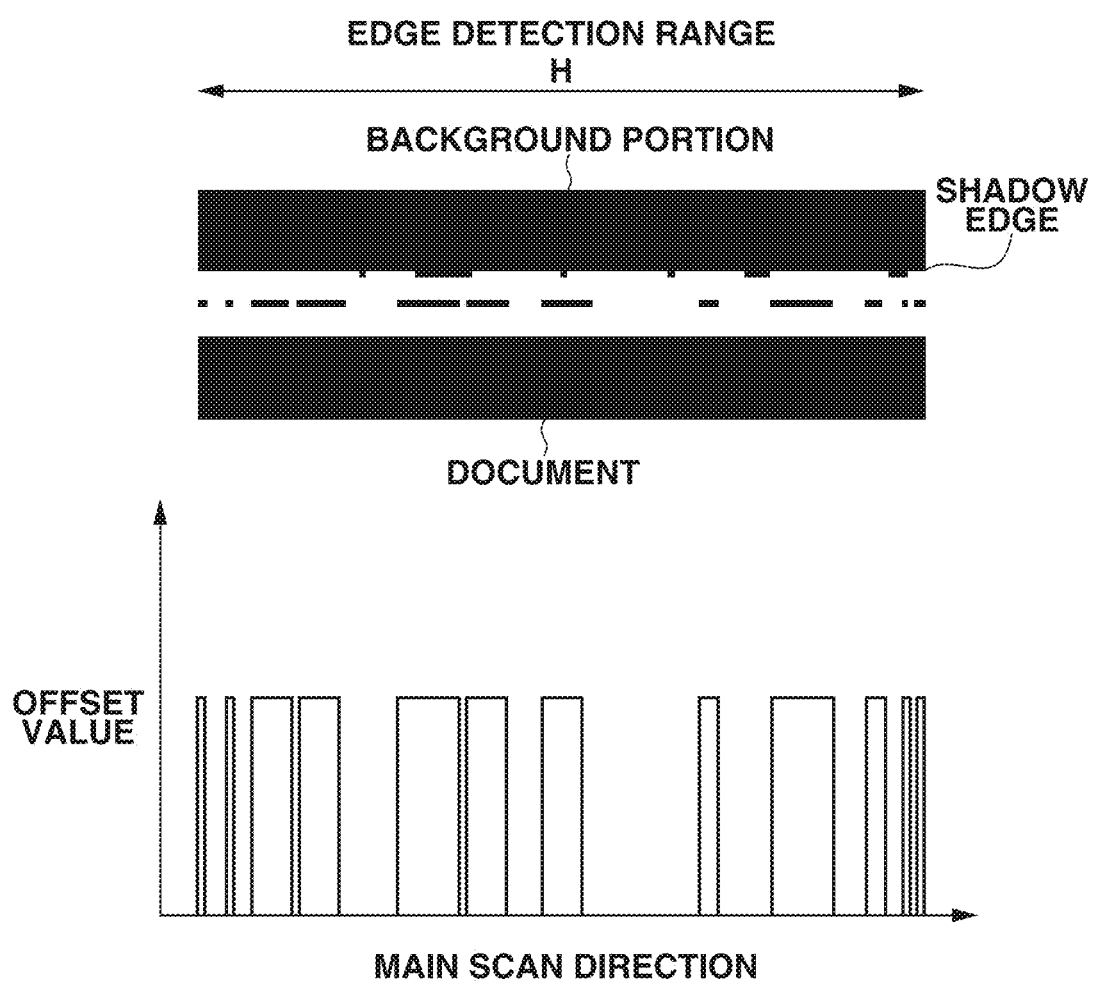
FIG. 15 illustrates an example of a relationship between an edge detection range and an offset value according to the exemplary embodiment.

A method of determining an edge position in the sub-scan direction in S1404 will be described below. As described above, in a case where a light shadow emerges, an edge continues from the edge position detected in S1402, and a second edge change is sometimes undetected at a position in the main scan direction. Thus, as illustrated in FIG. 15, the percentage of the number of pixels with the offset value "0" stored in S1404 or the number of pixels outside the upper limit value "V" of the sub-scan search range with respect to the number of pixels in the edge detection range H is calculated, and an offset value is determined based on the calculation result using the below-described table. FIG. 15 illustrates an example of the relationship between the edge detection range and the offset value.

TABLE 1

Offset Value Determination Process

| Percentage | Offset Value |
| --- | --- |
| Lower Than 25% | Detection results in S1404 are not used, and a predetermined value is used. |
| 25% or Higher and Lower Than 50% | Calculate a median value of the values in the vicinity of the most frequent value among the results in S1404, and in a case where the median value is extremely far from the predetermined value, the predetermined value is used. In a case where the median value is not extremely far, a mean value of the predetermined value and the median value is used. |

TABLE 1-continued

Offset Value Determination Process

| Percentage | Offset Value |
| --- | --- |
| 50% or Higher and Lower Than 75% | The median value of the values in the vicinity of the most frequent value among the results in S1404 is used. |
| 75% or Higher | Use all results in S1404. |

In Table 1, in a case where the percentage of the number of pixels with the offset value "0" stored in S1404 or the number of pixels outside the upper limit value "V" of the sub-scan search range with respect to the number of pixels of the edge detection range H is lower than 25%, it is determined that the reliability of the detection results in S1404 is low. In this case, an offset value known from the result of observation of a shadow width in advance is used as the predetermined value. The offset value can be a result of observation in advance or can manually be input and registered at the time of shipment.

Next, in a case where the percentage of the number of pixels with the offset value "0" stored in S1404 or the number of pixels outside the upper limit value "V" of the sub-scan search range with respect to the number of pixels of the edge detection range H is 25% or higher and lower than 50%, a median value is calculated from the values in the vicinity of the most frequent value among the detection results (offset values) in S1404. Then, in a case where the median value is extremely far from the predetermined value, the predetermined value is used. This takes the low reliability of the detection results into consideration as in the above-described determination. On the other hand, in a case where the calculated median value is not extremely far from the predetermined value, the offset value is updated with a mean value of the predetermined value and the median value. Since the reliability of the detection results is not that low, the predetermined value is corrected using the measured values to increase the accuracy.

In a case where the percentage of the number of pixels with the offset value "0" stored in S1404 or the number of pixels outside the upper limit value "V" of the sub-scan search range with respect to the number of pixels of the edge detection range H is 50% or higher and lower than 75%, the reliability of the detection results in S1404 is relatively high but is not high enough to use all the results. Thus, the median value of the values in the vicinity of the most frequent value of the offset values acquired in S1404 is used as a new offset value. The accuracy of the detection results is expected to be increased by using the median value and eliminating exceptional values.

Lastly, in a case where the percentage of the number of pixels with the offset value "0" stored in S1404 or the number of pixels outside the upper limit value "V" of the sub-scan search range with respect to the number of pixels of the edge detection range H is 75% or higher, the reliability of the detection results in S1404 is high, so that all the detection results with respect to the respective positions are used. The percentages specified above are mere examples, and a user can arbitrarily change the threshold percentages, such as 25% or 50%, for making determinations. Further, the predetermined value and the median value of the values in the vicinity of the most frequent value can be used with respect to all the percentages.

An approximate document start position (not a shadow portion but a document portion) can be obtained by subtracting the offset value obtained using Table 1 from the document start position stored in S1402.

<Tilt Formula Calculation Unit>

A process of calculating a linear formula by the tilt formula calculation unit 308 will be described below. The tilt formula calculation unit 308 determines an effective data range of edge detection results for use in linear formula calculation based on the right and left main scan edge positions determined by the edge determination unit 306 and the edge position in the sub-scan direction that is detected by the edge detection unit 403.

The tilt formula calculation unit 308 calculates a linear formula representing a skew amount with respect to the main scan direction in the effective data range. The linear formula calculation is performed by a common method, such as the method of least squares or Hough transform.

A periphery portion, especially a corner portion, of the document 103 may be damaged due to tearing, natural deterioration, or corner breaking. Thus, the tilt formula calculation unit 308 performs linear formula calculation using the edge detection results in the effective data range.

The tilt formula calculation unit 308 calculates the position of the center of the document image ((left main-scan edge position)+(right main-scan edge position)/2) and the length of the document image ((right main-scan edge position)−(left main-scan edge position)) based on the right and left main scan edge positions determined by the edge determination unit 306.

The tilt formula calculation unit 308 acquires values of a predetermined number of pixels in the main scan direction within the range of the length (between the right main-scan edge position and the left main-scan edge position) of the document image with the position of the center of the document image being the center based on the edge detection results. The predetermined number of pixels in the main scan direction with the position of the center of the document image being the center are the effective data range.

Figure 9:
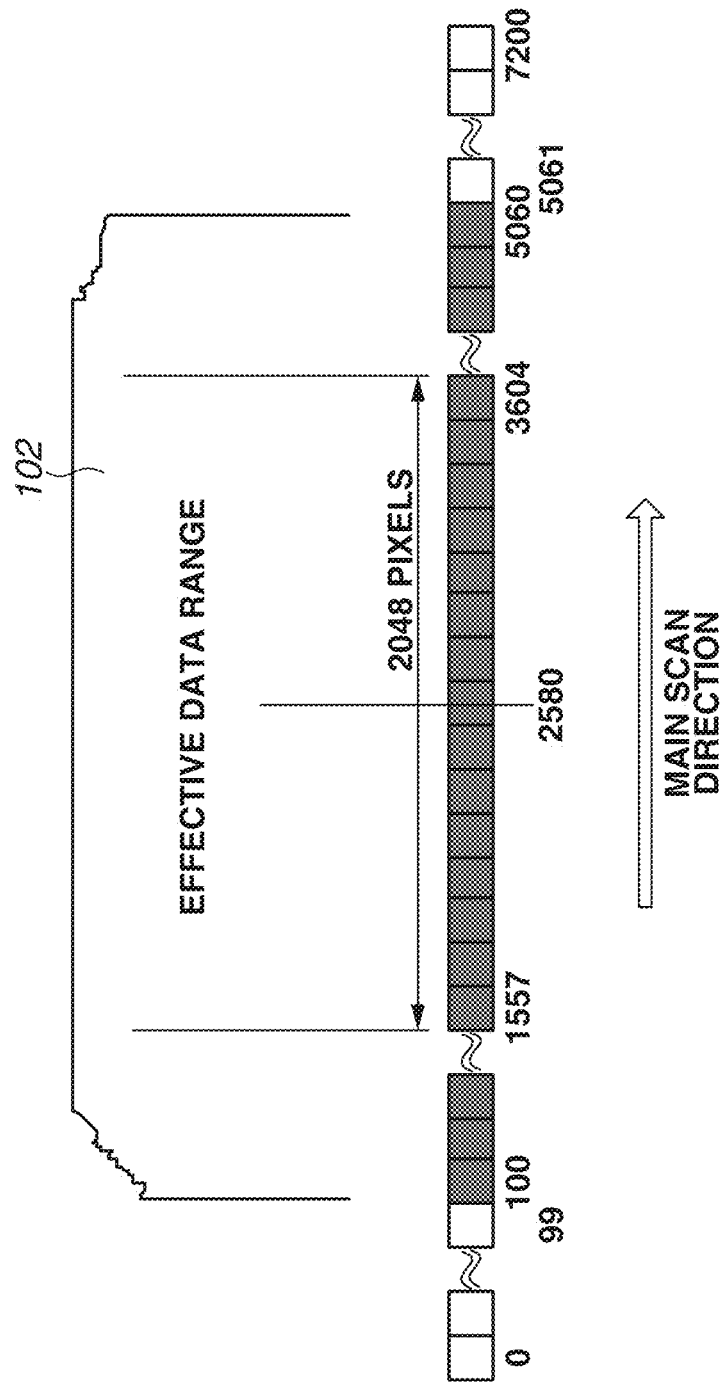
FIG. 9 illustrates an example of an effective data range according to the exemplary embodiment.

FIG. 9 illustrates an example of an effective data range. In FIG. 9, the number of pixels in the main scan direction is 7200, and the leftmost pixel is the first pixel and the rightmost pixel is the $7200^{th}$ pixel in FIG. 9. The edge determination unit 306 determines that the left main-scan edge position is the $100^{th}$ pixel and the right main-scan edge position is the $5060^{th}$ pixel.

In this case, the position of the center of the document image is the $2580^{th}$ pixel, and the length of the document image is 4960 pixels. In FIG. 9, the range of 2048 pixels ($1557^{th}$ pixel to $2604^{th}$ pixel) in the main scan direction with the position of the center of the document image being the center is the effective data range.

The tilt formula calculation unit 308 calculates a linear formula (y=ax+b) representing a skew amount based on the sub-scan edge position in the effective data range. Specifically, a skew amount (a), a tilt direction, an intercept (b), and an intercept direction are calculated, and it is also determined whether the skew amount and the tilt direction (sign) of the intercept are positive or negative. The length of the document image that is calculated by the processing may be output to the CPU 301 and used to determine a main scan size of the document to be read.

<Reference Position Calculation Unit>

A process of calculating a reference position by the reference position calculation unit 309 will be described below. An example of calculating a corner position at a left periphery portion of a document image in the sub-scan direction as a reference position will be described below. The reference position calculation unit 309 calculates a corner position at one of the right and left periphery portions as a reference position based on an instruction from the CPU 301.

In a case where the periphery portion of the document 103 is damaged, it is difficult to accurately determine a corner position of a document image from the edge detection results, so that the corner position is estimated. In order to accurately estimate the corner position, the left main-scan edge position determined by the edge determination unit 306, the edge position in the sub-scan direction that is detected by the edge detection unit 403, and the linear formula calculated by the tilt formula calculation unit 308 are used.

Figure 10:
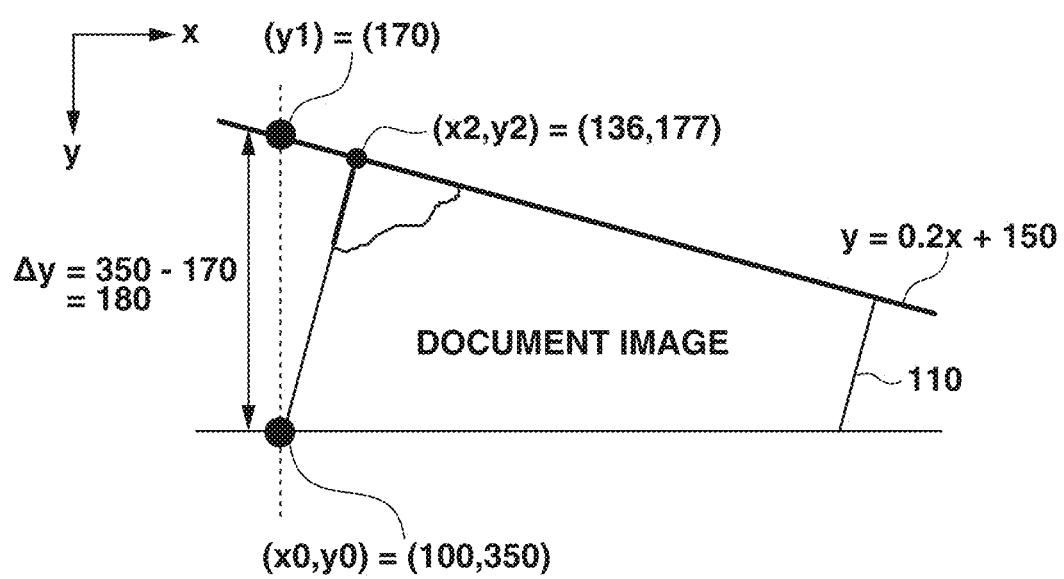
FIG. 10 illustrates an example of a process of calculating a reference position according to the exemplary embodiment.

FIG. 10 illustrates an example of a process of calculating a reference position. FIG. 10 is an example of a case where a left main-scan edge position x0 is "100", a position y0 of an edge 110 at the left main-scan edge position in the sub-scan direction is "350", and the linear formula is (y=0.2x+150), and the reference position is (x2, y2).

In this case, a position y1 of an intersection point (virtual reference position) of a straight line extending through the left main-scan edge position in the sub-scan direction (y-direction) and the linear formula in the sub-scan direction is expressed as (y1=0.2×100+150=170). A difference Δy between the left main-scan edge position y0 and the position y1 in the sub-scan direction is expressed as (Δy=350−170=180). Accordingly, 36 pixels, which is a multiplication value of the difference Δy and the skew amount a, is obtained as an adjustment amount in the main scan direction.

While the adjustment amount in the main scan direction is calculated by complicated and precise calculation in a conventional technique, the adjustment amount is calculated by the simplified method in the present exemplary embodiment as described above. With this calculation method, as the tilt of the document image increases, the accuracy of the adjustment amount decreases. However, in the range of tilts correctable by the skew correction unit 310, the CPU 301 performs control to enable an adjustment in less than one pixel (e.g., less than 42 um at 600 dpi).

The reference position calculation unit 309 calculates the reference position by adjusting the virtual reference position based on the calculated adjustment amount. The reference position calculation unit 309 determines whether the calculated adjustment amount in the main scan direction is to be adjusted in a positive direction (0) or a negative direction (1) with respect to the left main-scan edge position.

In a case where the tilt direction in the linear formula calculated by the tilt formula calculation unit 308 is positive (0), the document is tilted to the lower right and thus corrected in the positive direction with respect to the left main-scan edge position. On the other hand, in a case where the tilt direction in the linear formula calculated by the tilt formula calculation unit 308 is negative (1), the document image is tilted to the upper right and thus corrected in the negative direction with respect to the left main-scan edge position.

For example, in a case where the document image is tilted to the lower right (tilt direction: positive (0)) and the left main-scan edge position x0 is the $100^{th}$ pixel and the adjustment amount is 36 pixels as in FIG. 10, the reference position calculation unit 309 determines that an adjustment is to be made in the positive direction (0). Further, the reference position calculation unit 309 estimates the (100+36=136)th pixel as an estimated main scan edge position x2 at the left periphery portion of the document image. An estimated sub-scan edge position y2 is calculated by substituting the adjusted estimated main scan edge position x2 at the left periphery portion into the linear formula.

In the example in FIG. 10, the estimated sub-scan position (y2=0.2*136+150=177) at the left periphery portion is calculated by substituting the estimated main scan edge position x2 at the left periphery portion into the linear formula. While the values are rounded off to the nearest integer in this example, the values can be rounded down to the nearest integer. By the above-described process, the reference position calculation unit 309 estimates the reference position (x2, y2) for use in skew correction by the skew correction unit 310 at the time of skew correction.

Figure 11:
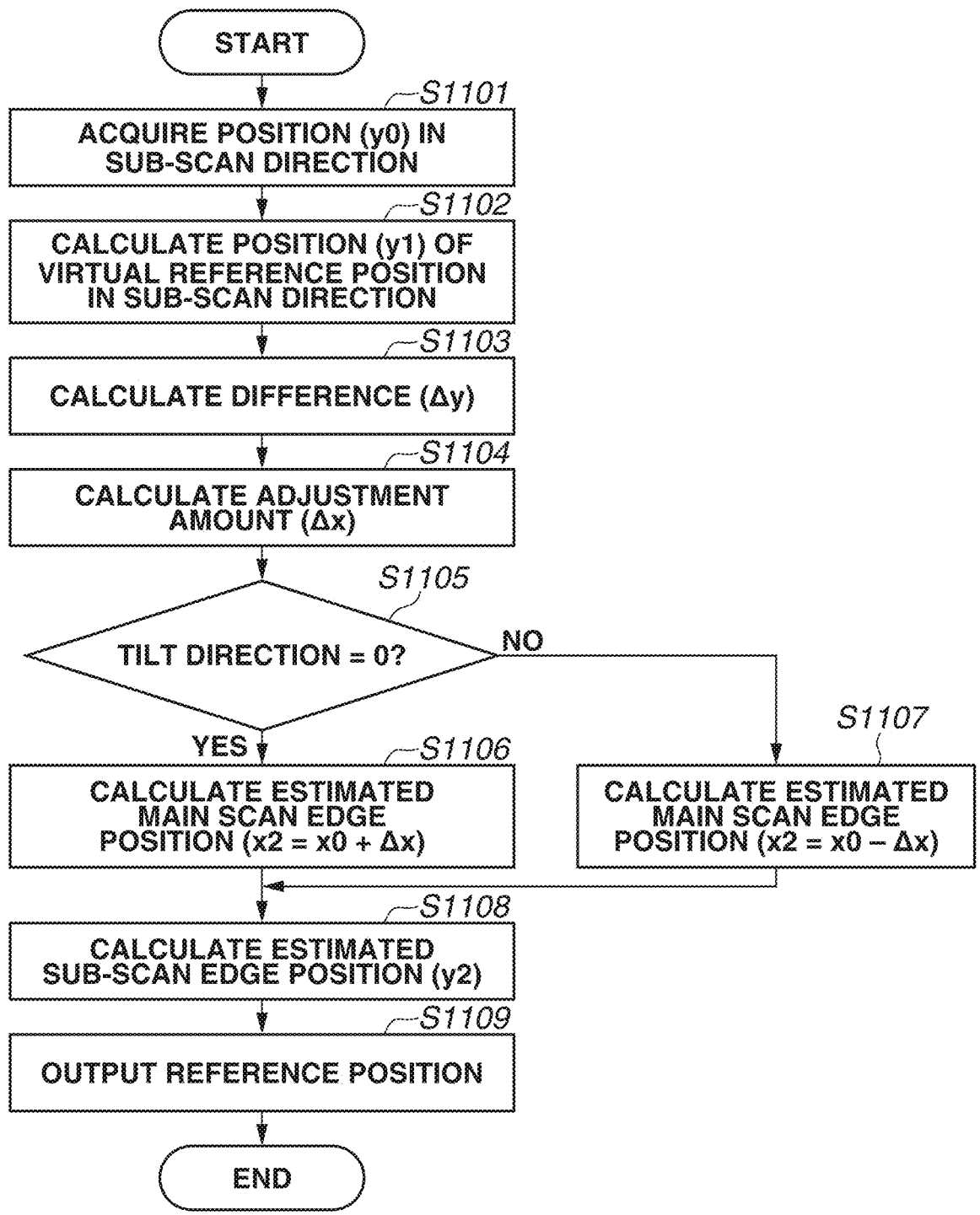
FIG. 11 is a flowchart illustrating an example of a process of calculating a reference position in skew correction according to the exemplary embodiment.

FIG. 11 is a flowchart illustrating an example of a process of calculating a reference position in skew correction. The process in FIG. 11 is started when the process in FIG. 14 is ended. The CPU 301 controls each piece of hardware so that the process in the flowchart in FIG. 11 is executed. Alternatively, the process in the flowchart in FIG. 11 can be executed by the CPU 301 by reading a program stored on the ROM (not illustrated) onto the memory 307 and executing the read program.

While a case where a corner of a left periphery portion is estimated as a reference position will be described below, a similar process is used in a case where a corner of a right periphery portion is estimated as a reference position.

In S1101, the CPU 301 controls the reference position calculation unit 309 and acquires the position y0 in the sub-scan direction that corresponds to the left main-scan edge position x0 determined by the edge determination unit 306.

In S1102, the CPU 301 controls the reference position calculation unit 309 and calculates the position y1 of the virtual reference position in the sub-scan direction by substituting the left main-scan edge position x0 determined by the edge determination unit 306 into the linear formula calculated by the tilt formula calculation unit 308.

In S1103, the CPU 301 controls the reference position calculation unit 309 and calculates the difference Δy by subtracting the sub-scan position y0 of the left main-scan edge position from the position y1 of the virtual reference position in the sub-scan direction.

In S1104, the CPU 301 controls the reference position calculation unit 309 and calculates the adjustment amount Δx by multiplying the difference Δy by the skew amount a in the linear formula calculated by the tilt formula calculation unit 308.

In S1105, the CPU 301 controls the reference position calculation unit 309 and determines whether the tilt direction in the linear formula calculated by the tilt formula calculation unit 308 is positive (0). In a case where the CPU 301 determines that the tilt direction is positive (0) (YES in S1105), the processing proceeds to S1106. In a case where the CPU 301 determines that the tilt direction is negative (1) (NO in S1105), the processing proceeds to S1107.

In S1106, the CPU 301 controls the reference position calculation unit 309 and calculates the estimated main scan edge position x2 by adding the adjustment amount Δx to the left main-scan edge position x0.

In S1107, the CPU 301 controls the reference position calculation unit 309 and calculates the estimated main scan edge position x2 by subtracting the adjustment amount Δx from the left main-scan edge position x0.

In S1108, the CPU 301 controls the reference position calculation unit 309 and calculates the estimated sub-scan edge position y2 to be a reference position in skew correction by substituting the calculated estimated main scan edge position x2 into the linear formula calculated by the tilt formula calculation unit 308.

In S1109, the CPU 301 controls the reference position calculation unit 309 and outputs the calculated estimated main scan edge position x2 and the calculated estimated sub-scan edge position y2 as a reference position in skew correction. By the above-described process, the reference position in skew correction is calculated.

<Skew Correction Unit>

The skew correction unit 310 performs skew correction and position correction on the image based on the skew amount and the tilt direction contained in the linear formula calculated by the tilt formula calculation unit 308 and the reference position estimated by the reference position calculation unit 309. The skew correction unit 310 performs skew correction using a common method such as affine transformation.

The skew correction unit 310 calculates the position (main scan direction (X), sub-scan direction (Y)) of each pixel of the document image corrected by an angle θ corresponding to the skew amount based on the below-described formulas (formulas (5) and (6)) of affine transformation. The skew correction unit 310 performs affine transformation on the digital image data stored on the memory 307 and output image data presenting the skew-corrected image.

Figure 12:
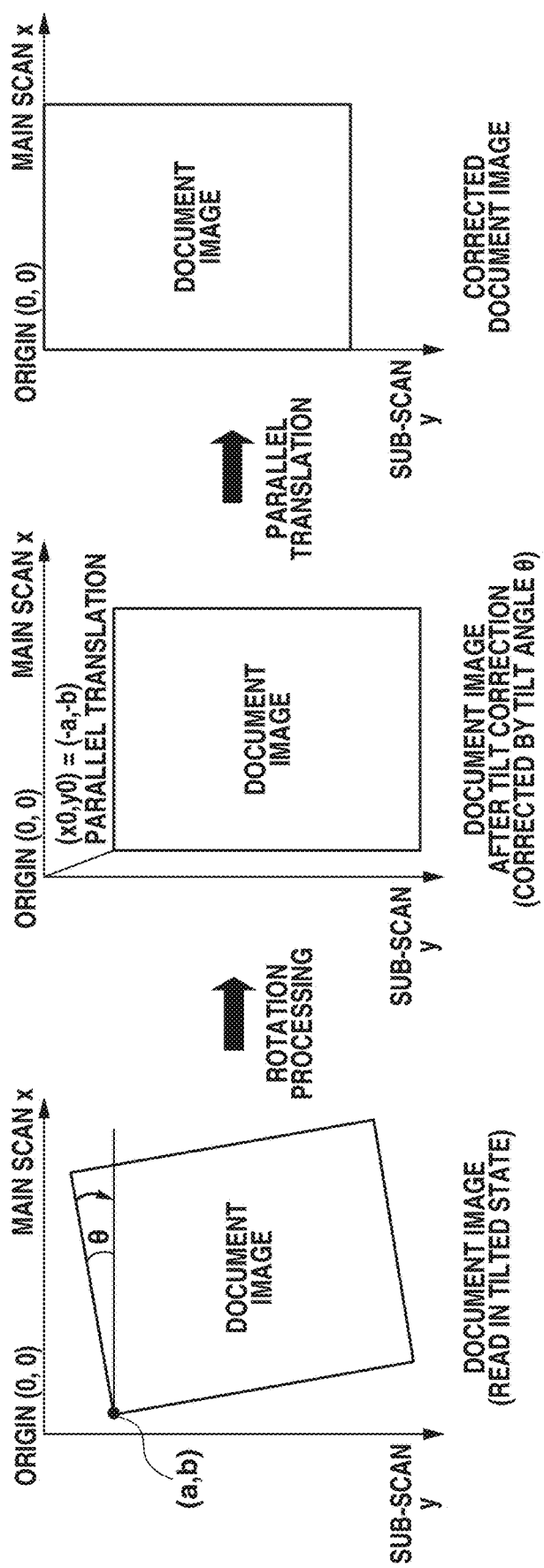
FIG. 12 illustrates an example of a process of skew correction according to the exemplary embodiment.

A reference position (x2, y2) is an amount of movement for parallel translation of the skew-corrected digital image data. With the amount of movement, an output position of a leading periphery portion and a periphery portion of a document image is aligned. A process by affine transformation is illustrated in FIG. 12. FIG. 12 illustrates an example of a process of skew correction. The skew correction unit 310 performs skew correction by rotation and parallel translation of the image.

$$X = x \cos\theta - y \sin\theta + x2 \qquad \text{formula (5)}$$

$$Y = x \sin\theta + y \cos\theta + y2 \qquad \text{formula (6)}$$

In formulas (5) and (6),

X: the pixel position after the correction in the main scan direction,

Y: the pixel position after the correction in the sub-scan direction, x: the pixel position in the main scan direction before the correction, y: the pixel position in the sub-scan direction before the correction, x2: the amount of parallel translation in the main scan direction (reference position in the main scan direction), y2: the amount of parallel translation in the sub-scan direction (reference position in the sub-scan direction), and θ: the angle based on the tilt calculated from the leading periphery of the document.

As described above, the scanner 100 according to the present exemplary embodiment reduces effects of emerging disturbance superimposed on a read image and generates image data presenting an image with reduced skew amount errors.

While the image data generated by the skew correction unit 310 is stored on the memory 307 in the present exemplary embodiment, the image data can be used in any processing after being stored on the memory 307. For example, the image data can be displayed as a preview image on the operation unit 210 or can be transmitted to an external apparatus via an email or facsimile via a network interface (not illustrated) of the scanner 100. Further, the image data can be used in copy processing.

Other Embodiments

Some embodiments can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-165458, which was filed on Sep. 11, 2019 and which is hereby incorporated by reference herein in its entirety.

What is claimed is:

1. An image reading apparatus configured to perform correction processing to correct a tilt of an image based on an edge identified from image data, the image reading apparatus comprising:
   a reading unit configured to read an image of a document and generate image data;
   a filtering unit configured to perform filtering processing to extract an edge of the image data generated by the reading unit and generate image data;
   a binarization unit configured to perform binarization processing based on the image data generated by the filtering unit using a first threshold value to generate first binary image data, and perform binarization processing based on the image data generated by the filtering unit using a second threshold value lower than the first threshold value to generate second binary image data; and
   an identification unit configured to identify an edge in the image data generated by the reading unit based on the first binary image data and the second binary image data generated by the binarization unit.

2. The image reading apparatus according to claim 1, wherein the identification unit identifies, as an edge, pixels that are consecutively lined up when pixels extracted as the edge contained in the first binary image data and pixels extracted as the edge contained in the second binary image data are combined.

3. The image reading apparatus according to claim 2, wherein a pixel that is extracted as the edge but is not identified as the edge by the identification unit is removed.

4. The image reading apparatus according to claim 1, wherein, among pixels that are not identified as the edge by the identification unit, a pixel that is on a straight line based on a pixel extracted as a consecutive edge is also identified as the edge by the identification unit.

5. The image reading apparatus according to claim 1, wherein the filtering unit performs convolution calculation processing on a pixel of the image data generated by the reading unit using a first-order derivative filter and generates image data from which the edge is extracted.

6. The image reading apparatus according to claim 5, further comprising a thinning unit configured to generate image data by thinning an edge of the image data from which the edge is extracted,
   wherein a first binarization unit and a second binarization unit perform binarization processing on the image data generated by the thinning unit.

7. The image reading apparatus according to claim 1, wherein the number of edges in the first binary image data generated by the binarization processing using the first threshold value is less than the number of edges in the second binary image data generated by the binarization processing using the second threshold value.

8. The image reading apparatus according to claim 5, wherein the first-order derivative filter is a Sobel filter of 3×3 pixels.

9. The image reading apparatus according to claim 1, further comprising a correction unit configured generate image data by correcting a skew generated when the image of the document is read by the reading unit based on the edge identified by the identification unit so that an image presented by the image data generated by the reading unit is corrected.

10. The image reading apparatus according to claim 9, wherein the correction unit generates the corrected image data based on a reference position of the image data generated by the reading unit and a skew amount of the edge based on the edge identified by the identification unit.

11. The image reading apparatus according to claim 10, wherein the reference position is a corner of a left periphery of the image presented by the image data.

12. A method of controlling an image reading apparatus configured to perform correction processing to correct a tilt of an image based on an edge identified from image data, the method comprising:
   reading an image of a document and generating image data;
   performing filtering processing to extract an edge of the generated image data and generating image data;
   perform binarization processing based on the image data generated by the filtering processing using a first threshold value to generate first binary image data, and performing binarization processing based on the image data generated by the filtering processing using a second threshold value lower than the first threshold value to generate second binary image data; and identifying an edge in the image data generated by the reading based on the first binary image data and the second binary image data generated by the binarization processing.

* * * * *